(12) United States Patent
Li et al.

(10) Patent No.: US 11,825,356 B2
(45) Date of Patent: *Nov. 21, 2023

(54) POLICY CONTROL METHOD AND SYSTEM, NETWORK ELEMENT, AND STORAGE MEDIUM

(71) Applicant: Huawei Technologies Co., Ltd., Shenzhen (CN)

(72) Inventors: Yongcui Li, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,509

(22) Filed: Dec. 23, 2021

(65) Prior Publication Data

US 2022/0124564 A1 Apr. 21, 2022

Related U.S. Application Data

(63) Continuation of application No. 16/283,198, filed on Feb. 22, 2019, now Pat. No. 11,240,711, which is a
(Continued)

(51) Int. Cl.
*H04W 36/12* (2009.01)
*H04W 76/22* (2018.01)
(Continued)

(52) U.S. Cl.
CPC ..... *H04W 36/0005* (2013.01); *H04L 41/0893* (2013.01); *H04W 36/0016* (2013.01);
(Continued)

(58) Field of Classification Search
None
See application file for complete search history.

(56) References Cited

U.S. PATENT DOCUMENTS

| 9,949,189 B2 | 4/2018 | Reddiboyana et al. |
| 2011/0075675 A1 | 3/2011 | Koodli et al. |

(Continued)

FOREIGN PATENT DOCUMENTS

| CN | 101488847 A | 7/2009 |
| CN | 101662415 A | 3/2010 |

(Continued)

OTHER PUBLICATIONS

"Data forwarding for Inter 3GPP-RAT HO," 3GPP TSG RAN WG3 Meeting #60, Kansas City, USA, R3-081287, pp. 1-3, 3rd Generation Partnership Project, Valbonne, France (May 5-9, 2008).
(Continued)

*Primary Examiner* — Gregory B Sefcheck
*Assistant Examiner* — Suk Jin Kang
(74) *Attorney, Agent, or Firm* — Leydig, Voit & Mayer, Ltd.

(57) ABSTRACT

Embodiments of the present disclosure provide a policy control method and system, a network element, and a storage medium. A control plane network element establishes, for UE, a first DN connection that uses a first forwarding plane network element as an anchor. The method includes: when the control plane network element receives a handover notification message for the UE and determines that a second forwarding plane network element serves the UE, or when the control plane network element establishes, for the UE, a second DN connection that uses a second forwarding plane network element as an anchor, the control plane network element updates a forwarding path of the first DN connection, so that an updated forwarding path of the first DN connection passes through the second forwarding plane network element, and the second forwarding plane network element performs policy control on a packet on the first DN connection.

20 Claims, 24 Drawing Sheets

Related U.S. Application Data continuation of application No. PCT/CN2016/096511, filed on Aug. 24, 2016.

(51) Int. Cl.
*H04W 76/15* (2018.01)
*H04L 41/0893* (2022.01)
*H04W 36/00* (2009.01)

(52) U.S. Cl.
CPC ....... *H04W 36/0027* (2013.01); *H04W 36/12* (2013.01); *H04W 76/15* (2018.02); *H04W 76/22* (2018.02)

(56) References Cited

U.S. PATENT DOCUMENTS

| | | |
|---|---|---|
| 2011/0320608 A1 | 12/2011 | Nelakonda et al. |
| 2012/0063300 A1 | 3/2012 | Sahin et al. |
| 2012/0269167 A1 | 10/2012 | Velev et al. |
| 2014/0010206 A1 | 1/2014 | Bi et al. |
| 2014/0348130 A1 | 11/2014 | Kaippallimalil et al. |
| 2015/0103665 A1 | 4/2015 | Kaippallimalil et al. |
| 2015/0109898 A1 | 4/2015 | Wang et al. |
| 2015/0124585 A1 | 5/2015 | Sahin et al. |
| 2015/0189563 A1 | 7/2015 | Chan et al. |
| 2015/0282026 A1 | 10/2015 | Gupta |
| 2015/0382386 A1 | 12/2015 | Castro Castro et al. |
| 2016/0105838 A1 | 4/2016 | Wang et al. |
| 2016/0112896 A1 | 4/2016 | Karampatsis et al. |
| 2016/0242097 A1 | 8/2016 | Dinan |
| 2016/0242225 A1 | 8/2016 | Wang et al. |
| 2017/0034860 A1 | 2/2017 | Berggren et al. |
| 2017/0086123 A1 | 3/2017 | Wang et al. |
| 2017/0208506 A1 | 7/2017 | Wang et al. |
| 2017/0251405 A1 | 8/2017 | Stojanovski et al. |
| 2018/0084477 A1 | 3/2018 | Wang et al. |
| 2018/0167854 A1 | 6/2018 | Enomoto et al. |
| 2018/0220327 A1 | 8/2018 | Karampatsis et al. |
| 2018/0288784 A1 | 10/2018 | Stojanovski et al. |
| 2018/0295659 A1 | 10/2018 | Shan |
| 2018/0310220 A1 | 10/2018 | Dinan |
| 2019/0014529 A1 | 1/2019 | Karampatsis et al. |
| 2019/0098545 A1 | 3/2019 | Zhang et al. |
| 2019/0104563 A1 | 4/2019 | Olsson et al. |
| 2019/0357113 A1 | 11/2019 | Wang et al. |
| 2020/0213928 A1 | 7/2020 | Li et al. |

FOREIGN PATENT DOCUMENTS

| | | |
|---|---|---|
| CN | 101677470 A | 3/2010 |
| CN | 101730174 A | 6/2010 |
| CN | 102724648 A | 10/2012 |
| CN | 102740384 A | 10/2012 |
| CN | 104956762 A | 9/2015 |
| CN | 105264918 A | 1/2016 |
| CN | 105794264 A | 7/2016 |
| EP | 2339785 B1 | 6/2013 |
| EP | 2683212 A1 | 1/2014 |
| WO | 2011098249 A2 | 8/2011 |
| WO | 2016047374 A1 | 3/2016 |

OTHER PUBLICATIONS

3GPP TS 23.203 V13.8.0 (Jun. 2016),3rd Generation Partnership Project;Technical Specification Group Services and System Aspects;Policy and charging control architecture(Release 13),total 245 pages.

Intel, "Solution for session management model," SA WG2 Meeting #115, Nanjing, p. R. China, S2-163115 (was 2934 was 2296 was 1825), total 5 pages, 3rd Generation Partnership Project, Valbonne, France (May 23-27, 2016).

Intel, "Update of Solution 6.1," SA WG2 Meeting #115, Nanjing, P.R. China, S2-163186 (was 3004 was 2682), total 9 pages, 3rd Generation Partnership Project, Valbonne, France (May 23-27, 2016).

Nokia et al., "Role of the common UP-GW in case of multi-homed (IPv6) PDU Session," SA WG2 Meeting #116, Vienna, Austria, S2-164251 (was S2-164157), total 4 pages, 3rd Generation Partnership Project, Valbonne, France (Jul. 11-15, 2016).

Ericsson, "Updates to Solution 6.1 on efficient SSC mode 2 and 3," SA WG2 Meeting #116, Vienna, Austria, S2-164260 (revision of S2-163989), total 14 pages, 3rd Generation Partnership Project, Valbonne, France (Jul. 11-15, 2016).

International Search Report dated Apr. 28, 2017 in corresponding International Patent Application No. PCT/CN2016/096511 (7 pages).

Written Opinion of the International Searching Authority dated Apr. 28, 2017 in corresponding International Patent Application No. PCT/CN2016/096511 (4 pages).

Extended European Search Report dated Mar. 28, 2019 in corresponding European Patent Application No. 16913765.0 (11 pages).

International Search Report dated Apr. 28, 2017 in corresponding International Application No. PCT/CN2016/096511.

POLICY CONTROL METHOD AND SYSTEM, NETWORK ELEMENT, AND STORAGE MEDIUM

CROSS-REFERENCE TO RELATED APPLICATIONS

This application is a continuation of U.S. patent application Ser. No. 16/283,198, filed on Feb. 22, 2019, which is a continuation of International Application No. PCT/CN2016/096511, filed on Aug. 24, 2016, All of the afore-mentioned patent applications are hereby incorporated by reference in their entireties.

TECHNICAL FIELD

Embodiments of the present disclosure relate to the communications field, and in particular, to a policy control method and system, a network element, and a storage medium.

BACKGROUND

An evolved packet system (EPS) includes two parts: an access network and a core network. A system architecture in a non-roaming scenario is shown in FIG. 1. In the system architecture, a radio access network is an evolved universal terrestrial radio access network (E-UTRAN), used to implement a function related to radio access. Key logical network elements in an evolved packet core (EPC) include a mobility management entity (MME), a serving gateway (S-GW), a packet data network gateway (P-GW), and a home subscriber server (HSS).

The MME mainly processes signaling plane functions, such as user authentication, handover, mobility management of a terminal in an idle mode, and management of a user context and a bearer. The HSS stores user subscription information. The S-GW is a user plane function entity, implements routing and forwarding of packet data, is used as a data anchor in a 3GPP system, terminates an interface towards the E-UTRAN, and is also a local mobility management anchor in an inter-E-UTRAN handover scenario in a specific geographical area. The P-GW is a gateway connected to an external data network, and is a user plane anchor between a 3GPP access network and a non-3GPP access network. User equipment (UE) may be connected to the P-GW to create a packet data network (PDN) connection, to visit an external PDN. The PDN may be the Internet, a virtual private network (VPN), an IP multimedia service (IMS) network, a Wireless Application Protocol (WAP) network provided by an operator, or the like.

In actual network deployment, the logical network elements S-GW and P-GW may be separated or integrated. In other cases than a particular case (for example, roaming), the logical network elements S-GW and P-GW are deployed through integration.

In an EPC architecture, an Internet Protocol (IP) address of the user equipment is used by the P-GW to provide routing to the outside. Therefore, as shown in FIG. 2, after the UE moves, an IP address and an uplink/downlink path of a service flow of the UE need to be anchored at the P-GW, to ensure IP continuity.

As a result, an uplink (UL) path and a downlink (DL) path of the service flow of the UE after movement are relatively long, and a delay is relatively large. Consequently, user experience is not high.

An existing EPS supports multi-PDN access, that is, the UE may access a plurality of PDNs by using a plurality of P-GWs or one P-GW, and the EPS supports the UE in accessing one PDN by using a plurality of P-GWs.

FIG. 2a is a schematic diagram of a plurality of PDN connections existed after the UE moves. In the figure, a forwarding plane network element may be the P-GW or another IP anchor in an EPC network. A PDN connection 1 and a PDN connection 2 are PDN connections existed after the UE moves, that is, after the UE moves, the UE visits a PDN by using the PDN connection 1, or visits a PDN by using the PDN connection 2. A PDN connection 3 is a newly-established PDN connection. The UE optimizes an uplink/downlink path of a new service by using the newly-established PDN connection 3.

In a scenario in which forwarding plane network elements are deployed in a distributed manner, distributed mobility management (DMM) solution proposes that a plurality of IP connections with relatively short paths may be established, that is, a plurality of PDN connections are established, so that different forwarding plane network elements relatively close to the UE are selected, to implement connection to a same PDN, thereby implementing routing path optimization.

Based on the existing DMM technical solution, after the UE establishes a plurality of PDN connections, because anchor gateway locations of all PDN connections are different and a policy and charging enforcement function (PCEF) is on an anchor gateway, one UE has a plurality of policy and charging enforcement functions. Consequently, some policies that need to be enforced in a cross-PDN connection case cannot be implemented, for example, charging policies at a granularity of APN-AMBR and at a granularity of UE. That is, when the UE establishes a plurality of PDN connections between the UE and the PDN and the UE accesses the PDN by using the plurality of PDN connections that pass through different forwarding plane network elements, the prior art provides no technical solution for how to perform policy control on user packets at a granularity of a plurality of PDN connections.

SUMMARY

Embodiments of the present disclosure provide a policy control method and system, a network element, and a storage medium, to implement some policies that need to be enforced in a cross-PDN connection case.

According to a first aspect, a policy control method is provided. A control plane network element establishes, for UE, a first data network (DN) connection that uses a first forwarding plane network element as an anchor. When the control plane network element receives a handover notification message for the UE and determines that a second forwarding plane network element serves the UE, or when the control plane network element establishes, for the UE, a second DN connection that uses a second forwarding plane network element as an anchor, the control plane network element updates a forwarding path of the first DN connection, so that an updated forwarding path of the first DN connection passes through the second forwarding plane network element, and the second forwarding plane network element performs policy control on a packet on the first DN connection.

According to a second aspect, a policy control method is provided. UE has a first DN connection that uses a first forwarding plane network element as an anchor. A second forwarding plane network element updates a forwarding path of the first DN connection, so that an updated forwarding path of the first DN connection passes through the second forwarding plane network element; and the second forwarding plane network element performs policy control on a packet on the first DN connection existed after the forwarding path is updated.

According to a third aspect, a policy control method is provided. UE has a first data network DN connection that uses a first forwarding plane network element as an anchor. A policy decision network element receives a first policy control session establishment request message sent by a control plane network element or a second forwarding plane network element, where the first policy control session establishment request message carries a connection identifier of the first DN connection; and the policy decision network element sends, to the second forwarding plane network element or the control plane network element based on the first policy control session establishment request message, a first service policy rule corresponding to the first DN connection, where the first service policy rule is used to perform policy control on a packet on the first DN connection.

According to another aspect, an embodiment of the present disclosure provides a control plane network element. The control plane network element may implement a function performed by the control plane network element in the foregoing method example. The function may be implemented by hardware, or may be implemented by hardware by executing corresponding software. The hardware or the software includes one or more modules corresponding to the function.

According to another aspect, an embodiment of the present disclosure provides a forwarding plane network element. The forwarding plane network element may implement a function performed by the forwarding plane network element in the foregoing method embodiment. The function may be implemented by hardware, or may be implemented by hardware by executing corresponding software. The hardware or the software includes one or more modules corresponding to the function.

According to another aspect, an embodiment of the present disclosure provides a policy decision network element. The policy decision network element may implement a function performed by the policy decision network element in the foregoing method embodiment. The function may be implemented by hardware, or may be implemented by hardware by executing corresponding software. The hardware or the software includes one or more modules corresponding to the function.

In a possible design, a structure of the above network element includes a processor and a communications interface. The processor is configured to support the network element in performing a corresponding function in the foregoing method. The communications interface is configured to support communication between the network element and another network element. The network element may further include a memory. The memory is configured to be coupled to the processor, and the memory stores a program instruction and data that are necessary for the network element.

According to another aspect, an embodiment of the present disclosure provides a policy control system. The system includes the control plane network element, the forwarding plane network element, and the policy decision network element that are described in the foregoing aspects.

According to still another aspect, an embodiment of the present disclosure provides a computer storage medium, configured to store a computer software instruction used by the foregoing control plane network element, the foregoing forwarding plane network element, or the foregoing policy decision network element, where the computer software medium includes a program designed for executing the foregoing aspects.

Compared with the prior art, in the solutions provided in the embodiments of the present disclosure, a policy control method in a multi-connection scenario is specifically provided. In a process in which the user equipment is handed over due to movement, when determining that a new forwarding plane network element serves the UE, the control plane network element performs policy control session migration, so that a user packet passes through the new forwarding plane network element, and policy control is performed on the user packet by using the forwarding plane network element. Alternatively, in a PDN connection establishment process, the control plane network element performs policy control session migration and/or forwarding path migration, so that user packets on all PDN connections pass through a same forwarding plane network element, and policy control is performed by using the forwarding plane network element. In the solutions of the present disclosure, the following case can be avoided: Policy control cannot be performed for all the PDN connections of the UE because user packet paths are dispersed.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure.

Network architectures and service scenarios that are described in the embodiments of the present disclosure are intended to describe the technical solutions in the embodiments of the present disclosure more clearly, but are not intended to limit the technical solutions provided in the embodiments of the present disclosure. A person of ordinary skill in the art may know that, as the network architectures evolve and a new service scenario emerges, the technical solutions provided in the embodiments of the present disclosure are also applicable to a similar technical problem.

Figure 1:
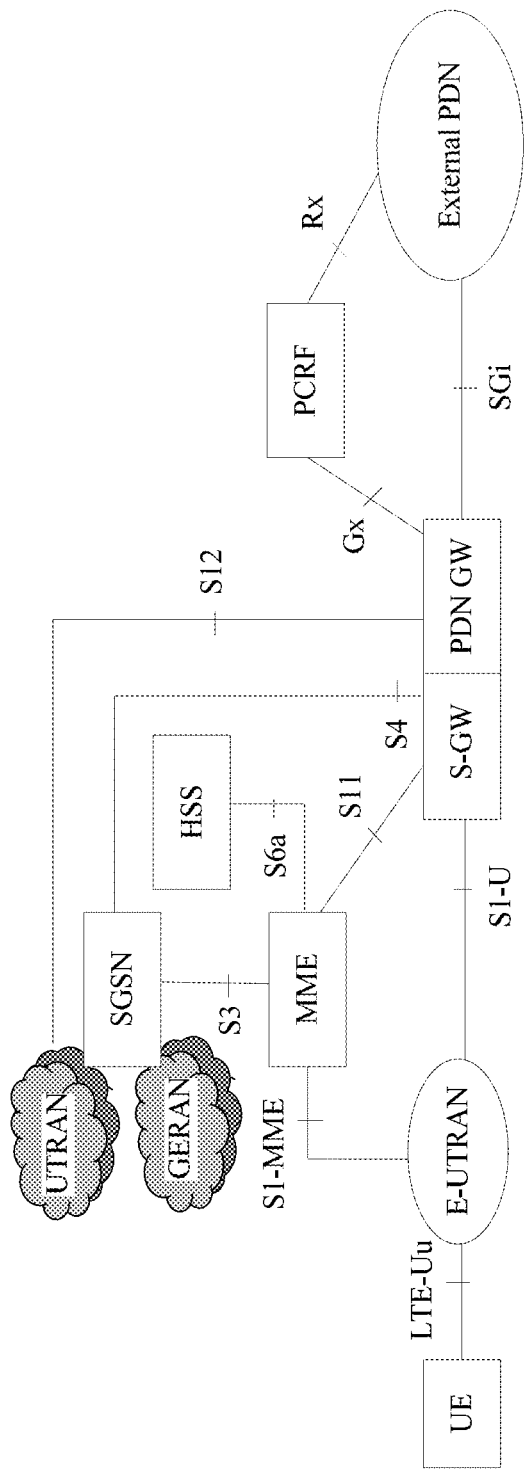
FIG. 1 is a schematic diagram of a system architecture of an EPC system.
Figure 2:
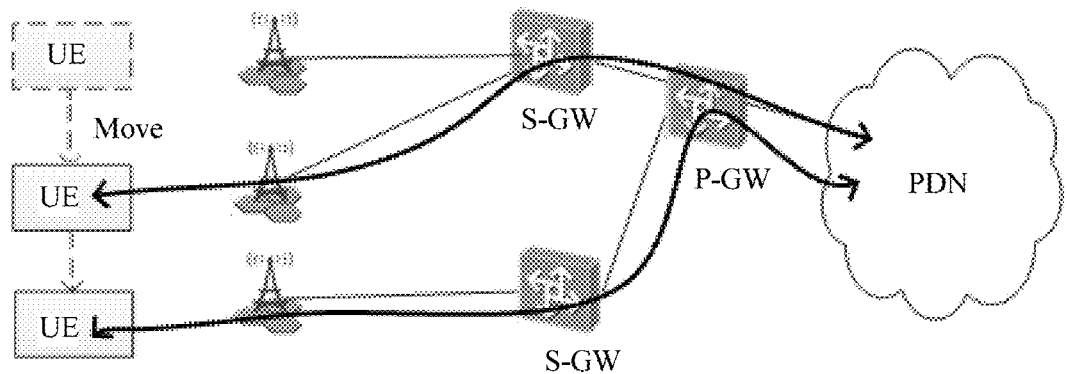
FIG. 2 is a schematic diagram of a path after UE moves in the system architecture shown in FIG. 1.
Figure 2A:
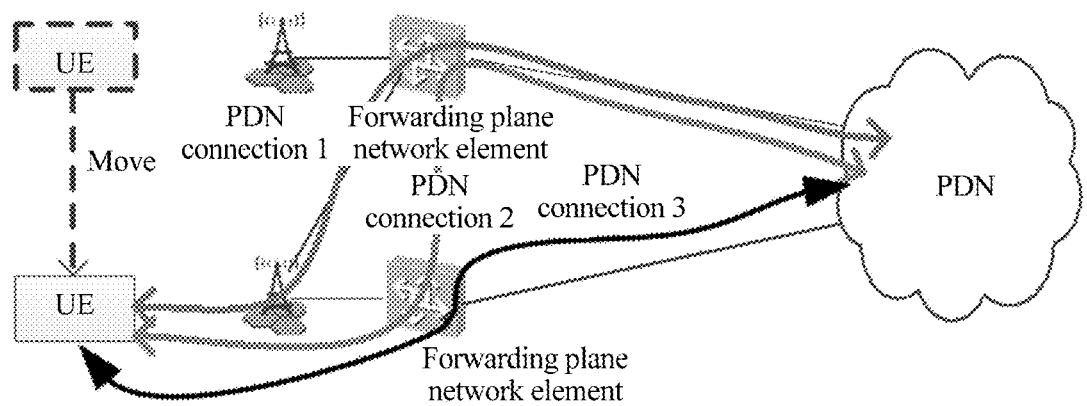
FIG. 2*a* is a schematic diagram of a plurality of PDN connections existed after UE moves.
Figure 3:
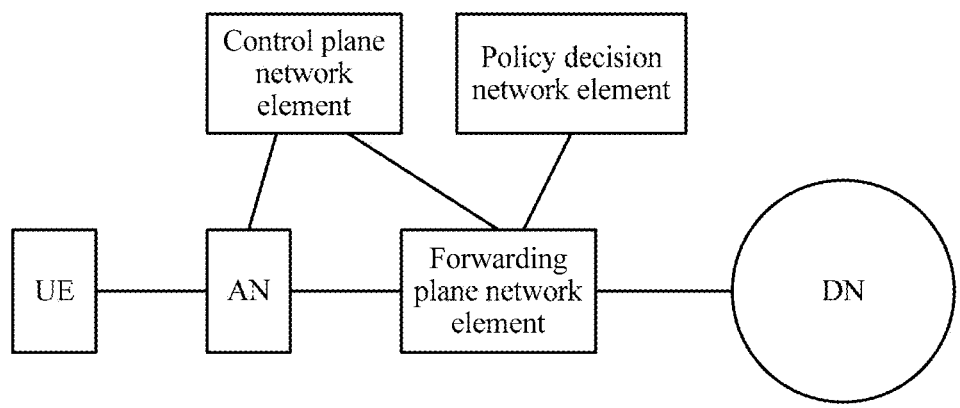
FIG. 3 is a schematic diagram of a possible system architecture for implementing the present disclosure.

FIG. 3 is a schematic diagram of a possible system architecture for implementing the present disclosure. The system architecture mainly includes the following network elements: UE, an access network (AN), a control plane network element, a forwarding plane network element, and a policy decision network element. The UE is a network terminal device, and includes but is not limited to a mobile phone, a network access terminal device, an Internet of Things terminal device, or the like. The AN is a device that provides radio access for a terminal device, and includes but is not limited to an evolved NodeB (eNodeB), a Wireless Fidelity (Wi-Fi) access point (AP), an access network (AN)/base station (BS) in the 5th generation mobile communications technology (5G), a Worldwide Interoperability for Microwave Access (WiMAX) BS, or the like. The control plane network element is a network element responsible for mobility management and/or forwarding path management in a mobile network, for example, a mobility management entity (MME), a gateway controller (GW-C), a software-defined networking (SDN) controller, or a mobile gateway controller formed after all or some functions of the foregoing network elements are combined. The forwarding plane network element is a network element that provides service packet forwarding for a user, and may be a physical or virtual forwarding device in an EPC network, for example, a PDN-GW, a PDN-GW forwarding plane, a router, a switch, or an SDN switch. The policy decision network element is responsible for performing policy control and/or charging control for the mobile network, and may be a PCRF in the EPC network.

In the system architecture shown in FIG. 3, a policy control session is between the forwarding plane network element and the policy decision network element.

Figure 4:
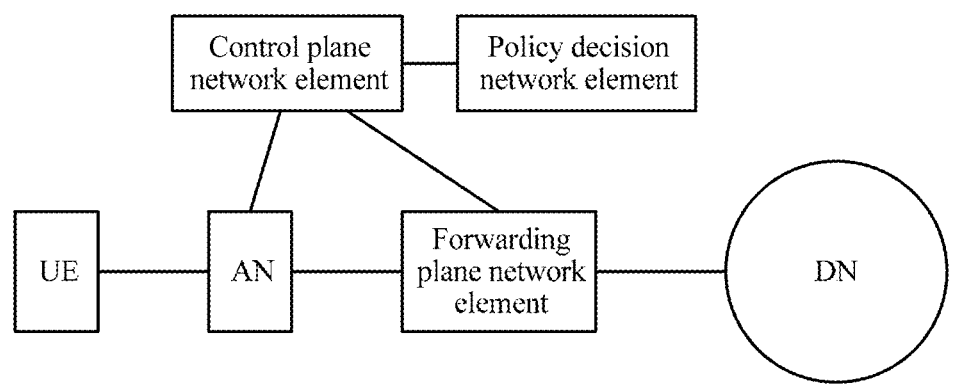
FIG. 4 is a schematic diagram of another possible system architecture for implementing the present disclosure.

FIG. 4 is a schematic diagram of another possible system architecture for implementing the present disclosure. A difference between the system architecture shown in FIG. 4 and the system architecture shown in FIG. 3 is as follows: The policy control session is between the forwarding plane network element and the policy decision network element in the system architecture shown in FIG. 3, and the policy control session is between the control plane network element and the policy decision network element in the system architecture shown in FIG. 4.

In the system architectures shown in FIG. 3 and FIG. 4, a data network (DN) is configured to provide a data transmission service for the user, and may be the Internet, an IMS, an enterprise network, or the like. The UE establishes a session connection between the UE and the DN, and the connection is referred to as a DN connection. The DN connection may be specifically a PDN connection.

In FIG. 3 and FIG. 4, the policy control session is a signaling connection between the control plane network element or the forwarding plane network element and the policy decision network element, and is used by the control plane network element or the forwarding plane network element to determine a service policy rule corresponding to a DN connection.

Figure 5:
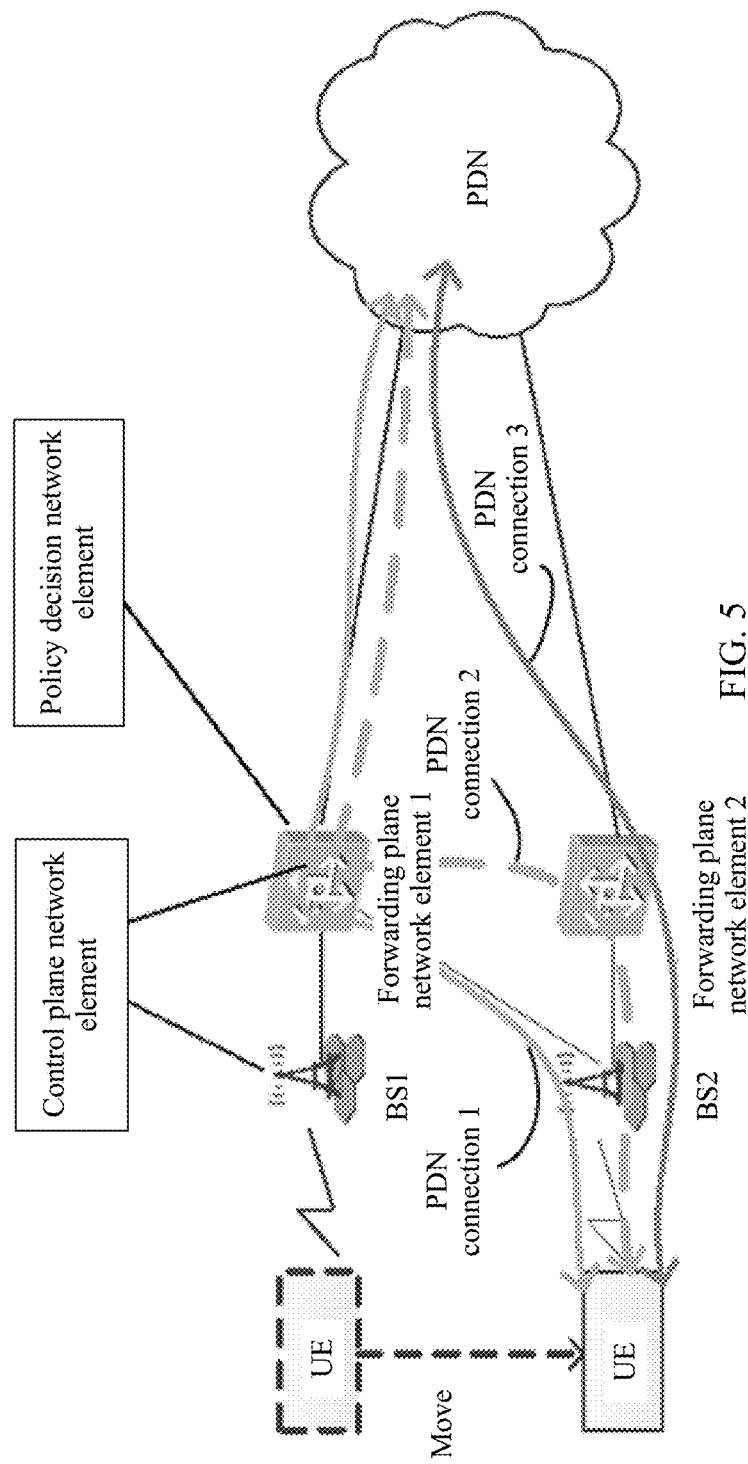
FIG. 5 is a schematic diagram of an application scenario according to an embodiment of the present disclosure.
Figure 6:
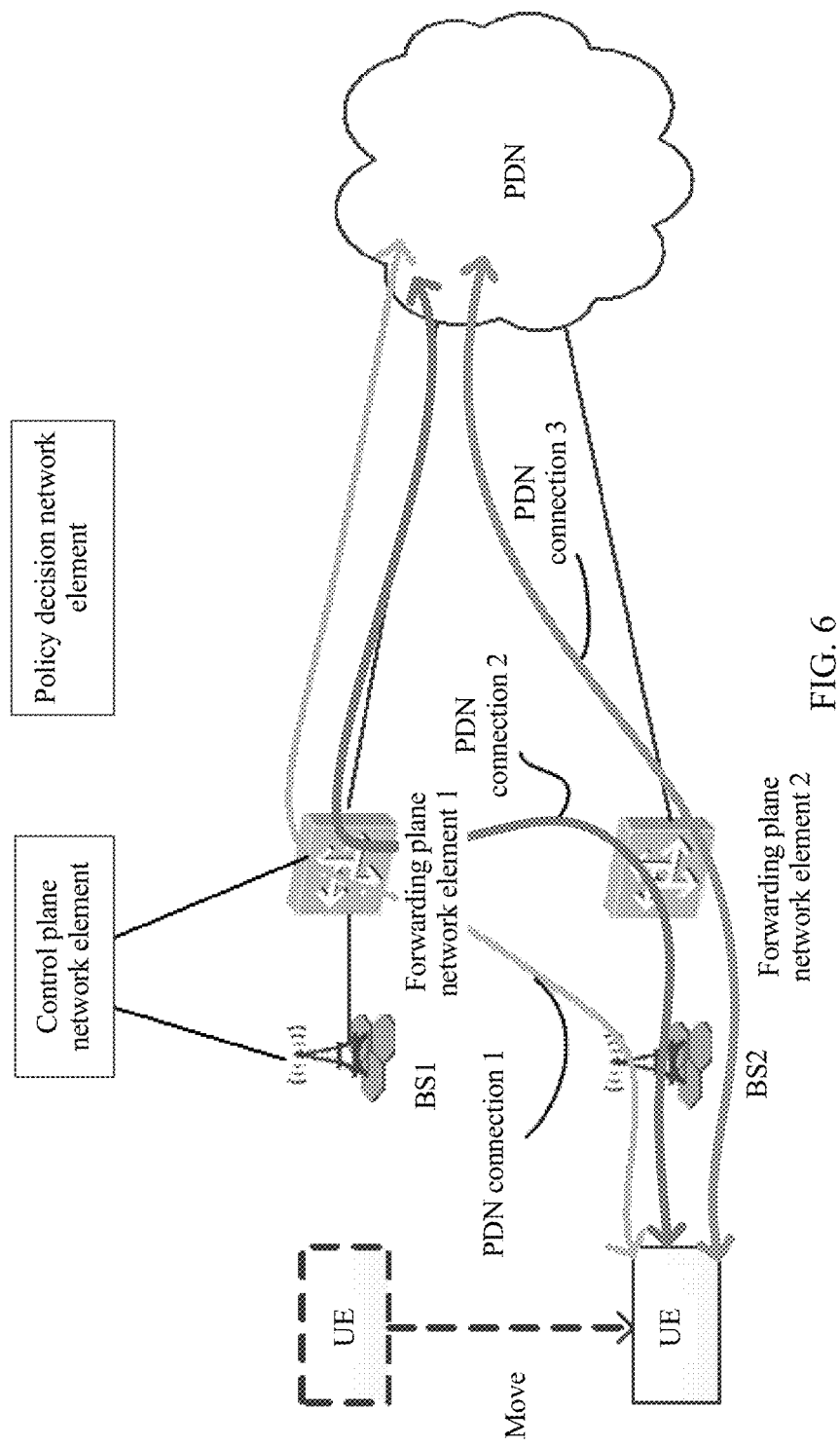
FIG. 6 is a schematic diagram of another application scenario according to an embodiment of the present disclosure.

FIG. 5 is a schematic diagram of an application scenario according to an embodiment of the present disclosure. The scenario is based on the system architecture shown in FIG. 3. A communication connection may be established between a control plane network element and each of a BS and a forwarding plane network element, and a policy control session may be established between a policy decision network element and the forwarding plane network element. FIG. 5 shows only a communication connection between the control plane network element and a BS1, a communication connection between the control plane network element and a forwarding plane network element 1, and a policy control session between the policy decision network element and the forwarding plane network element 1. FIG. 6 is a schematic diagram of another application scenario according to an embodiment of the present disclosure. The scenario is based on the system architecture shown in FIG. 4. A communication connection may be established between a control plane network element and each of a BS and a forwarding plane network element, and a policy control session may be established between a policy decision network element and the control plane network element. FIG. 6 shows only a communication connection between the control plane network element and a BS1, and a communication connection between the control plane network element and a forwarding plane network element 1. Referring to FIG. 5 and FIG. 6, UE is handed over in a movement process. For example, when the UE moves in a direction of an arrow in the figure, the UE is handed over from the BS1 to a BS2, and visits a DN by using a DN connection 1 or a DN connection 2. In addition, when the UE initiates a new service, the UE may further establish a new DN connection between the UE and the DN, to optimize routing of the new service of the UE. For example, when the UE falls within coverage of the BS2, the UE initiates a new DN connection establishment process, and visits the DN by using a DN connection 3.

As shown in FIG. 5 and FIG. 6, the DN connection 1 uses the forwarding plane network element 1 as an anchor; the DN connection 2 uses the forwarding plane network element 1 as an anchor, and a forwarding path passes through a forwarding plane network element 2 and the forwarding plane network element 1; and the DN connection 3 uses the forwarding plane network element 2 as an anchor.

A basic idea of the present disclosure is as follows: In a process in which the user equipment is handed over due to movement, when determining that a new forwarding plane network element serves the UE, the control plane network element performs policy control session migration, so that a user packet passes through the new forwarding plane network element, and policy control is performed on the user packet by using the forwarding plane network element. Alternatively, in a DN connection establishment process, the control plane network element performs policy control session migration and/or forwarding path migration, so that user packets on all DN connections pass through a same forwarding plane network element, and policy control is performed on the user packets by using the forwarding plane network element.

The policy control session is a signaling connection between the control plane network element or the forwarding plane network element and the policy decision network element, and is used by the control plane network element or the forwarding plane network element to determine a service policy rule corresponding to a DN connection. The forwarding path migration means updating a forwarding path of the UE, so that all DN connections of the UE pass through a same forwarding plane network element, and policy control is performed on user packets at a granularity of a plurality of DN connections by using the forwarding plane network element. For example, as shown in FIG. 5, after the UE is handed over due to movement, the UE accesses the DN by using the DN connection 1, and the UE accesses the DN network by using the new DN connection 3 established by the UE. In this case, the UE has two policy enforcement points, that is, the forwarding plane network element 1 performs policy control on a user packet on the DN connection 1, and the forwarding plane network element 2 performs policy control on a user packet on the DN connection 3. In addition, the DN connection 1 does not pass through the forwarding plane network element 2. In this case, forwarding path migration is performed, to migrate a forwarding path between the BS2 and the forwarding plane network element 1 to a location between the BS2 and the forwarding plane network element 2 and a location between the forwarding plane network element 2 and the forwarding plane network element 1.

First, a policy control method provided in the present disclosure is generally described by using the following four embodiments.

Embodiment 1

Figure 7A:
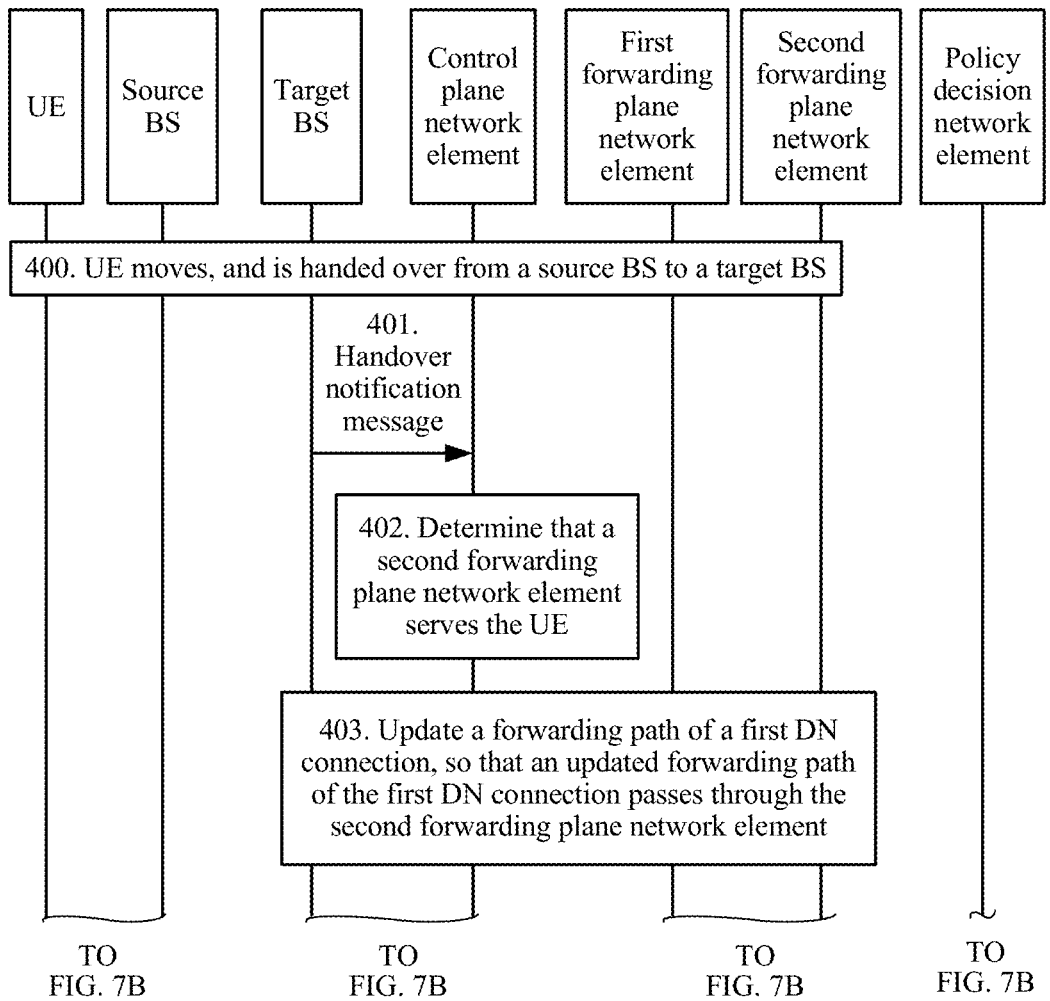
FIG. 7A and FIG. 7B are a signal flow diagram of a policy control method according to Embodiment 1 of the present disclosure.
Figure 7B:
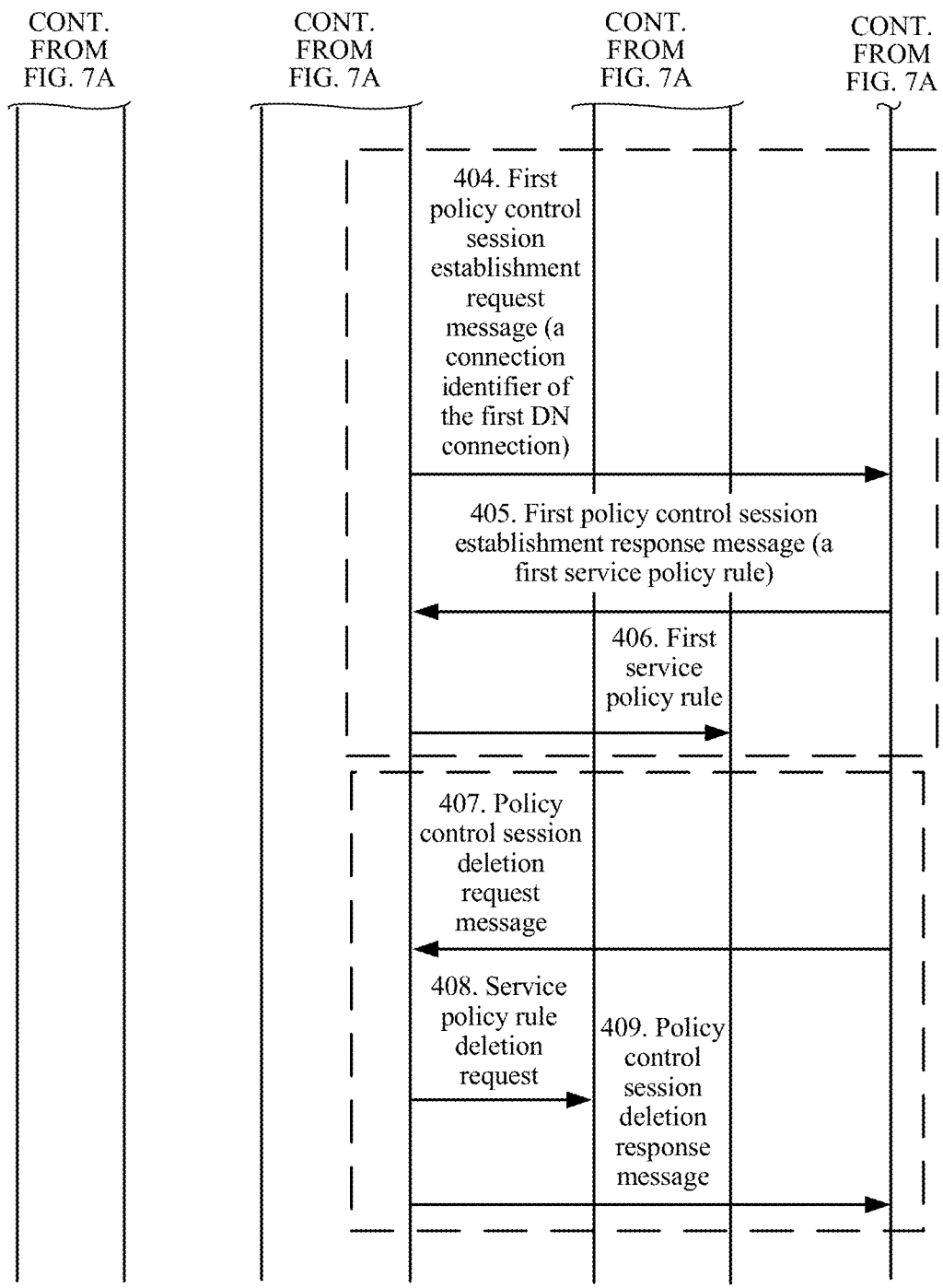

FIG. 7A and FIG. 7B are a signal flow diagram of a policy control method according to an embodiment of the present disclosure. The method is mainly executed by UE, a BS, a control plane network element, a first forwarding plane network element, a second forwarding plane network element, and a policy decision network element. The control plane network element establishes, for the UE, a first DN connection that uses the first forwarding plane network element as an anchor. When receiving a handover notification message for the UE and determining that the second forwarding plane network element serves the UE, the control plane network element updates a forwarding path, and performs policy control session migration. This embodiment is based on the system architecture shown in FIG. 4 and the application scenario shown in FIG. 6, that is, a policy control session is between the control plane network element and the policy decision network element. In FIG. 7A and FIG. 7B, a BS (a source BS) accessed by the UE before movement is the BS1 in FIG. 6, a BS (a target BS) accessed by the UE after movement is the BS2 in FIG. 6, the first forwarding plane network element is the forwarding plane network element 1 in FIG. 6, and the second forwarding plane network element is the forwarding plane network element 2 in FIG. 6. A specific scenario is described as follows: When the UE falls within coverage of the source BS, the control plane network element establishes, for the UE, the first DN connection that uses the first forwarding plane network element as an anchor, and when the UE is handed over to the target BS due to movement, the control plane network element updates the forwarding path of the first DN connection, so that the UE accesses a DN by using the DN connection 2 shown in FIG. 6. For a specific policy control session migration process triggered in this scenario, refer to FIG. 7A and FIG. 7B. The method includes the following steps.

Step 400. The UE moves, and is handed over from the source BS to the target BS.

Step 401. The control plane network element receives the handover notification message from the target BS.

Step 402. The control plane network element determines that the second forwarding plane network element serves the UE.

Step 403. The control plane network element updates the forwarding path of the first DN connection, so that an updated forwarding path of the first DN connection passes through the second forwarding plane network element.

In an example, step 403 may specifically include the following: The control plane network element sends a first packet forwarding policy to the first forwarding plane network element, sends a second packet forwarding policy to the second forwarding plane network element, and sends a third packet forwarding policy to a base station serving the UE. The first packet forwarding policy, the second packet forwarding policy, and the third packet forwarding policy are used to establish a packet forwarding path that is between the first forwarding plane network element and the second forwarding plane network element and that is corresponding to the first DN connection, and a packet forwarding path that is between the second forwarding plane network element and the base station and that is corresponding to the first DN connection.

After step 403, the method further includes a process in which the second forwarding plane network element determines a first service policy rule corresponding to the first DN connection. The first service policy rule includes an indication identifier or tunnel information. The indication identifier or the tunnel information is used to notify the second forwarding plane network element to perform, based on an Internet Protocol IP 5-tuple in a tunnel, flow detection on a downlink packet received from the first forwarding plane network element. The process in which the second forwarding plane network element determines the first service policy rule corresponding to the first DN connection may be implemented by using the following steps 404 to 406:

Step 404. The control plane network element sends a first policy control session establishment request message to the policy decision network element, where the first policy control session establishment request message carries a connection identifier of the first DN connection.

The first policy control session establishment request message may further carry an identifier of the second forwarding plane network element, and the identifier is used by the policy decision network element to determine that a policy enforcement point of the first DN connection is located at the second forwarding plane network element.

Step 405. The policy decision network element determines, based on the first policy control session establishment request message, a first service policy rule corresponding to the first DN connection, and sends a first policy control session establishment response message to the control plane network element, where the message carries the first service policy rule. The first service policy rule is used to notify the second forwarding plane network element to perform policy control on a packet on the first DN connection according to the first service policy rule.

Step 406. The control plane network element sends the first service policy rule to the second forwarding plane network element.

The first service policy rule is used to notify the second forwarding plane network element to perform policy control on the packet on the first DN connection.

It should be noted that there is no strict execution sequence between step 403 and steps 404 and 405. When steps 404 and 405 are performed before step 403, step 403 and step 406 that the control plane network element sends the first service policy rule to the second forwarding plane network element may be combined, that is, in step 403, when the control plane network element sends the second packet forwarding policy to the second forwarding plane network element, the second packet forwarding policy further carries the first service policy rule.

In addition, in this embodiment of the present disclosure, a second DN connection (corresponding to the DN connection 3 in FIG. 6) that uses the second forwarding plane network element as an anchor may further be established after the UE is handed over due to movement. Therefore, for ease of description, in a plurality of policy control sessions between the control plane network element and the policy decision network element, a signaling connection corresponding to the first DN connection existed after the forwarding path is updated is referred to as a first policy control session, the first policy control session is used to determine a service policy rule corresponding to the first DN connection existed after the forwarding path is updated, and the service policy rule is referred to as the first service policy rule. In the plurality of policy control sessions between the control plane network element and the policy decision network element, a signaling connection corresponding to the second DN connection is referred to as a second policy control session, the second policy control session is used to determine a service policy rule corresponding to the second DN connection, and the service policy rule is referred to as a second service policy rule. In the plurality of policy control sessions between the control plane network element and the policy decision network element, a signaling connection corresponding to the first DN connection existing before the forwarding path is updated is referred to as a third policy control session, the third policy control session is used to determine a service policy rule corresponding to the first DN connection existing before the forwarding path is updated, and the service policy rule is referred to as a third service policy rule.

This embodiment of the present disclosure further includes a process in which the first forwarding plane network element deletes the third service policy rule corresponding to the first DN connection. This process may be specifically implemented by using the following steps 407 and 408:

Step 407. The policy decision network element sends a policy control session deletion request message to the control plane network element, where the policy control session deletion request message is used to delete a third policy control session between the control plane network element and the policy decision network element.

Step 408. The control plane network element sends a service policy rule deletion request to the first forwarding plane network element, to notify the first forwarding plane network element to delete a third service policy rule corresponding to the first DN connection.

Optionally, the first forwarding plane network element sends a service policy rule deletion response message to the control plane network element.

Step 409. The control plane network element sends a policy control session deletion response message to the policy decision network element.

It should be noted that step 407 may be any step performed after step 404.

Embodiment 2

Figure 8A:
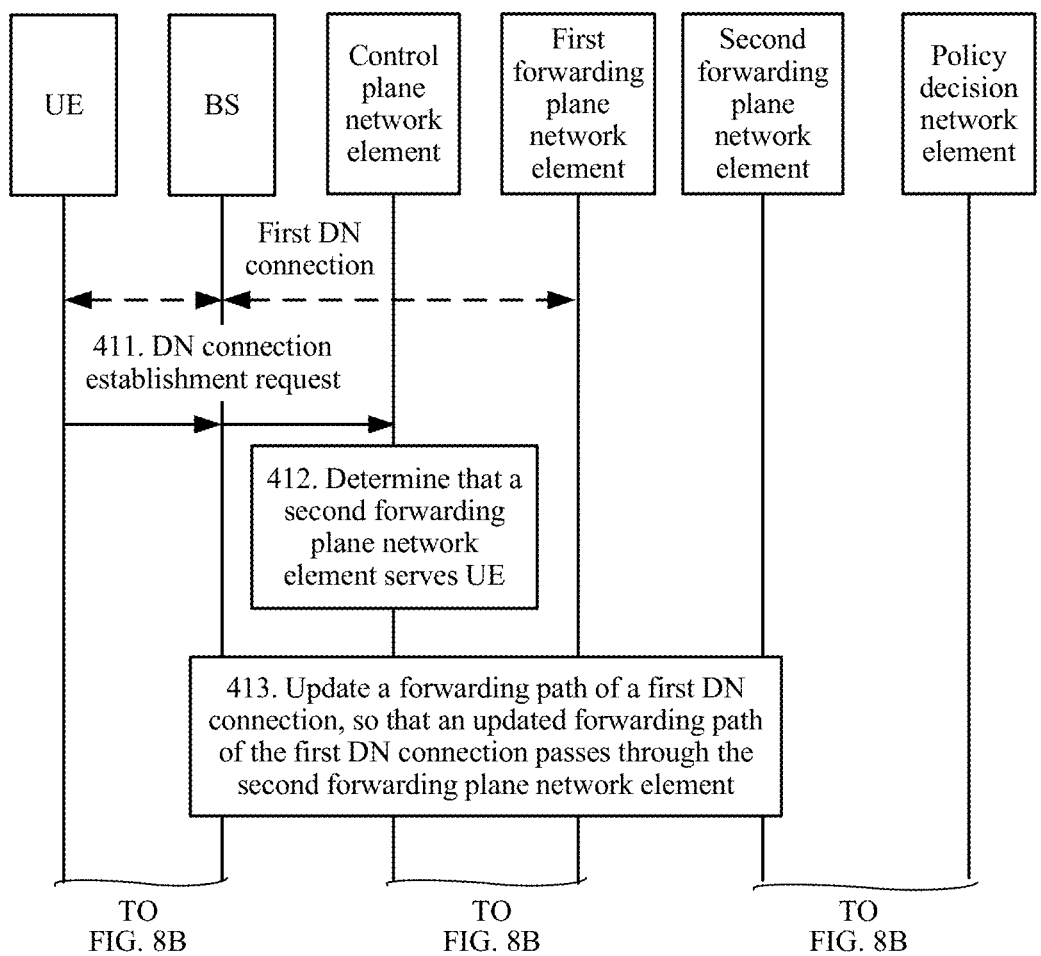
FIG. 8A and FIG. 8B are a signal flow diagram of a policy control method according to Embodiment 2 of the present disclosure.
Figure 8B:
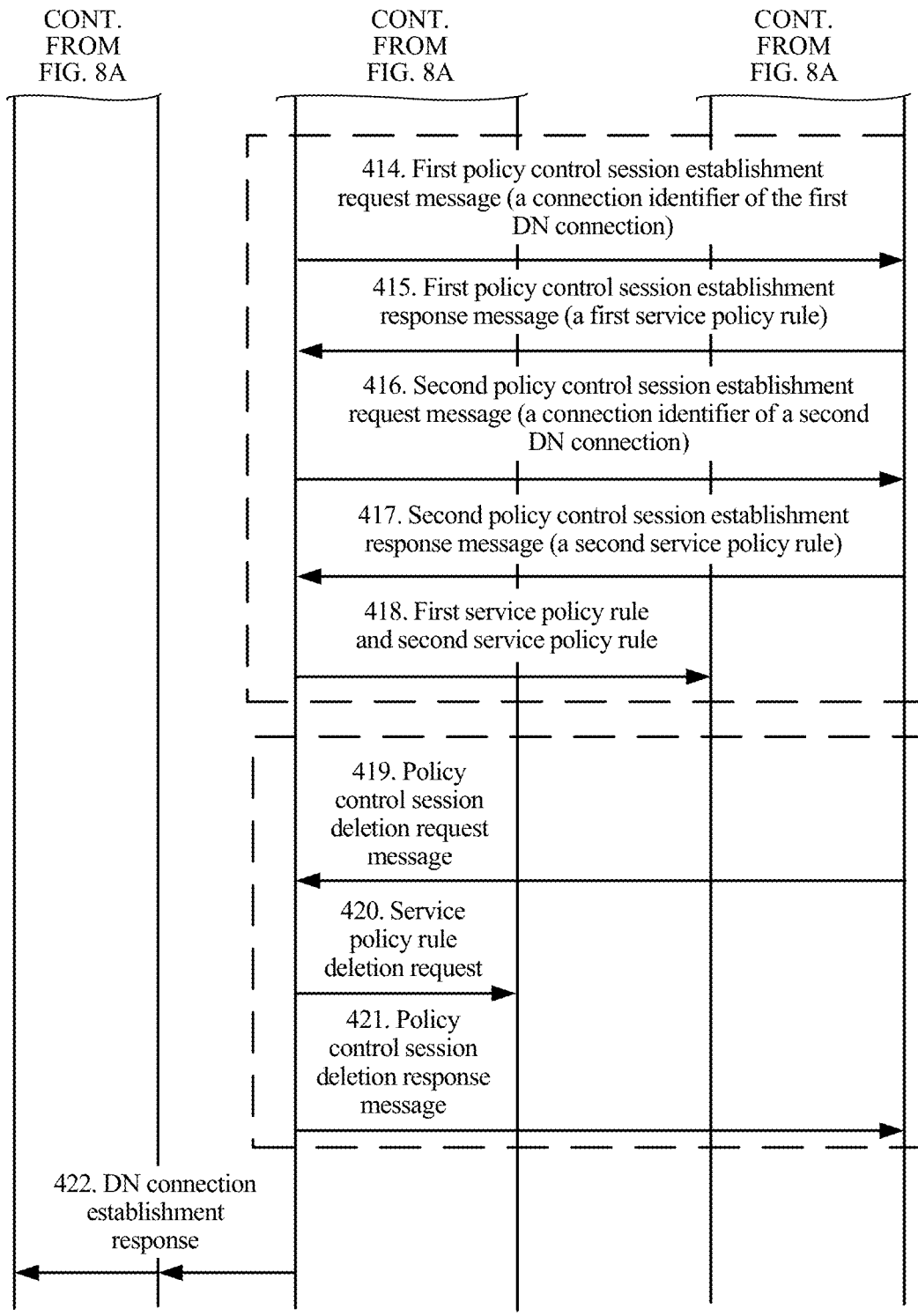

FIG. 8A and FIG. 8B are a signal flow diagram of another policy control method according to an embodiment of the present disclosure. The method is mainly executed by UE, a BS, a control plane network element, a first forwarding plane network element, a second forwarding plane network element, and a policy decision network element. The control plane network element establishes, for the UE, a first DN connection that uses the first forwarding plane network element as an anchor. When establishing, for the UE, a second DN connection that uses the second forwarding plane network element as an anchor, the control plane network element performs policy control session migration and forwarding path migration. This embodiment is based on the system architecture shown in FIG. 4 and the application scenario shown in FIG. 6, that is, a policy control session is between the control plane network element and the policy decision network element. In FIG. 8A and FIG. 8B, a source BS is the BS1 in FIG. 6, a target BS is the BS2 in FIG. 6, the first forwarding plane network element is the forwarding plane network element 1 in FIG. 6, and the second forwarding plane network element is the forwarding plane network element 2 in FIG. 6. A specific scenario is described as follows: When the UE falls within coverage of the source BS, the control plane network element establishes, for the UE, the first DN connection that uses the first forwarding plane network element as an anchor, and when the UE is handed over to the target BS due to movement, the control plane network element updates a forwarding path of the first DN connection, so that the UE accesses a DN by using the DN connection 1 or the DN connection 2 that is shown in FIG. 6. For a specific policy control session migration process and/or a specific forwarding path migration process (a forwarding path migration process existing when the UE is handed over to the target BS due to movement and accesses the DN by using the DN connection 1 shown in FIG. 6) that are/is triggered in this scenario, refer to FIG. 8A and FIG. 8B. The method includes the following steps.

Step 411. The UE initiates a process of establishing the second DN connection, and sends a DN connection establishment request to the control plane network element by using the BS.

Step 412. The control plane network element determines that the second forwarding plane network element serves the UE.

Step 413. The control plane network element updates the forwarding path of the first DN connection, so that an updated forwarding path of the first DN connection passes through the second forwarding plane network element.

In addition, the control plane network element may further establish a forwarding path of the second DN connection.

In an example, step 413 may specifically include the following: The control plane network element sends a first packet forwarding policy to the first forwarding plane network element, sends a second packet forwarding policy to the second forwarding plane network element, and sends a third packet forwarding policy to a base station serving the UE. The first packet forwarding policy, the second packet forwarding policy, and the third packet forwarding policy are used to establish a packet forwarding path that is between the first forwarding plane network element and the second forwarding plane network element and that is corresponding to the first DN connection, and a packet forwarding path that is between the second forwarding plane network element and the base station and that is corresponding to the first DN connection. In addition, the control plane network element may further send a fourth packet forwarding policy to the second forwarding plane network element, and send a fifth packet forwarding policy to the base station serving the UE, to establish a packet forwarding path that is between the base station and the second forwarding plane network element and that is corresponding to the second DN connection.

After step 413, the method further includes a process in which the second forwarding plane network element determines a first service policy rule corresponding to the first DN connection and a second service policy rule corresponding to the second DN connection. The first service policy rule includes an indication identifier or tunnel information. The indication identifier or the tunnel information is used to notify the second forwarding plane network element to perform, based on an Internet Protocol IP 5-tuple in a tunnel, flow detection on a downlink packet received from the first forwarding plane network element. The process may be implemented by using the following steps 414 to 418.

For ease of description, in this embodiment, in a plurality of policy control sessions between the control plane network element and the policy decision network element, a signaling connection corresponding to the first DN connection existed after the forwarding path is updated is referred to as a first policy control session, the first policy control session is used to determine a service policy rule corresponding to the first DN connection existed after the forwarding path is updated, and the service policy rule is referred to as the first service policy rule. In the plurality of policy control sessions between the control plane network element and the policy decision network element, a signaling connection corresponding to the second DN connection is referred to as a second policy control session, the second policy control session is used to determine a service policy rule corresponding to the second DN connection, and the service policy rule is referred to as the second service policy rule. In the plurality of policy control sessions between the control plane network element and the policy decision network element, a signaling connection corresponding to the first DN connection existing before the forwarding path is updated is referred to as a third policy control session, the third policy control session is used to determine a service policy rule corresponding to the first DN connection, and the service policy rule is referred to as a third service policy rule.

Step 414. The control plane network element sends a first policy control session establishment request message to the policy decision network element, where the first policy control session establishment request message carries a connection identifier of the first DN connection.

The first policy control session establishment request message may further carry an identifier of the second forwarding plane network element, and the identifier is used by the policy decision network element to determine that a policy enforcement point of the first DN connection is located at the second forwarding plane network element.

Step 415. The policy decision network element determines, based on the first policy control session establishment request message, a first service policy rule corresponding to the first DN connection, and sends a first policy control session establishment response message to the control plane network element, where the message carries the first service policy rule. The first service policy rule is used to notify the second forwarding plane network element to perform policy control on a packet on the first DN connection according to the first service policy rule.

Step 416. The control plane network element sends a second policy control session establishment request message to the policy decision network element, where the second policy control session establishment request message carries a connection identifier of the second DN connection.

Step 417. The policy decision network element determines, based on the second policy control session establishment request message, a second service policy rule corresponding to the second DN connection, and sends a second policy control session establishment response message to the control plane network element, where the message carries the second service policy rule. The second service policy rule is used to notify the second forwarding plane network element to perform policy control on a packet on the second DN connection according to the second service policy rule.

Step 418. The control plane network element sends the first service policy rule and the second service policy rule to the second forwarding plane network element.

It should be noted that there is no strict execution sequence between steps 414 and 415 and steps 416 and 417. In addition, there is no strict execution sequence between step 413 and steps 414 to 417 either. When steps 414 to 417 are performed before step 413, step 413 and step 418 that the control plane network element sends the first service policy rule and the second service policy rule to the second forwarding plane network element may be combined, that is, in step 413, when the control plane network element sends the second packet forwarding policy to the second forwarding plane network element, the second packet forwarding policy further carries the first service policy rule, and when the control plane network element sends the fourth packet forwarding policy to the second forwarding plane network element, the fourth packet forwarding policy further carries the second service policy rule.

This embodiment of the present disclosure further includes a process in which the first forwarding plane network element deletes the third service policy rule corresponding to the first DN connection. This process may be specifically implemented by using the following steps 419 to 421:

Step 419. The policy decision network element sends a policy control session deletion request message to the control plane network element, where the policy control session deletion request message is used to delete a third policy control session between the control plane network element and the policy decision network element.

Step 420. The control plane network element sends a service policy rule deletion request to the first forwarding plane network element, to notify the first forwarding plane network element to delete a third service policy rule corresponding to the first DN connection.

Optionally, the first forwarding plane network element sends a service policy rule deletion response message to the control plane network element.

Step 421. The control plane network element sends a policy control session deletion response message to the policy decision network element.

It should be noted that step 419 may be any step performed after step 414.

Step 422. The control plane network element sends a DN connection establishment response to the UE by using the BS.

It should be additionally noted that, that the control plane network element obtains, from the policy decision network element, the first service policy rule corresponding to the first DN connection existed after the forwarding path is updated and the second service policy rule corresponding to the second DN connection includes the following two methods: The control plane network element establishes one policy control session between the control plane network element and the policy decision network element, to obtain, from the policy decision network element by using the policy control session, the first service policy rule corresponding to the first DN connection, and obtain, by using the policy control session, the second service policy rule corresponding to the second DN connection. Alternatively, the control plane network element establishes two policy control sessions between the control plane network element and the policy decision network element, to obtain, from the policy decision network element by using one of the two policy control sessions, the first service policy rule corresponding to the first DN connection, and obtain, by using the other policy control session, the second service policy rule corresponding to the second DN connection.

In this embodiment of the present disclosure, the second manner is described in FIG. 8B, that is, the control plane network element establishes two policy control sessions between the control plane network element and the policy decision network element, to obtain, by using one of the two policy control sessions, the first service policy rule corresponding to the first DN connection, and obtain, by using the other policy control session, the second service policy rule corresponding to the second DN connection.

For the first manner, that is, when there is only one policy control session between the control plane network element and the policy decision network element, steps 414 to 417 in the signal flow diagram in FIG. 8B may be replaced with the following processing process: The control plane network element sends a policy control session establishment request to the policy decision network element, where the request carries an identifier of the first DN connection and an identifier of the second DN connection. The policy decision network element determines, based on the received policy control session establishment request, the first service policy rule corresponding to the first DN connection and the second service policy rule corresponding to the second DN connection, and sends a policy control session establishment response message to the control plane network element, where the message carries the first service policy rule and the second service policy rule.

Alternatively, the control plane network element sends a policy control session establishment request to the policy decision network element, where the request carries an identifier of the second DN connection. The policy decision network element determines the second service policy rule corresponding to the second DN connection, and sends a policy control session establishment response message to the control plane network element, where the message carries the second service policy rule.

The control plane network element sends a policy control session request message to the policy decision network element, where the message carries an identifier of the first DN connection.

The policy decision network element determines the first service policy rule corresponding to the first DN connection, and sends a policy control session response message to the control plane network element, where the message carries the first service policy rule.

Alternatively, the control plane network element sends a policy control session establishment request to the policy decision network element, where the request carries an identifier of the first DN connection. The policy decision network element determines the first service policy rule corresponding to the first DN connection, and sends a policy control session establishment response message to the control plane network element, where the message carries the first service policy rule.

The control plane network element sends a policy control session request message to the policy decision network element, where the message carries an identifier of the second DN connection.

The policy decision network element determines the second service policy rule corresponding to the second DN connection, and sends a policy control session response message to the control plane network element, where the message carries the second service policy rule.

Embodiment 3

Figure 9:
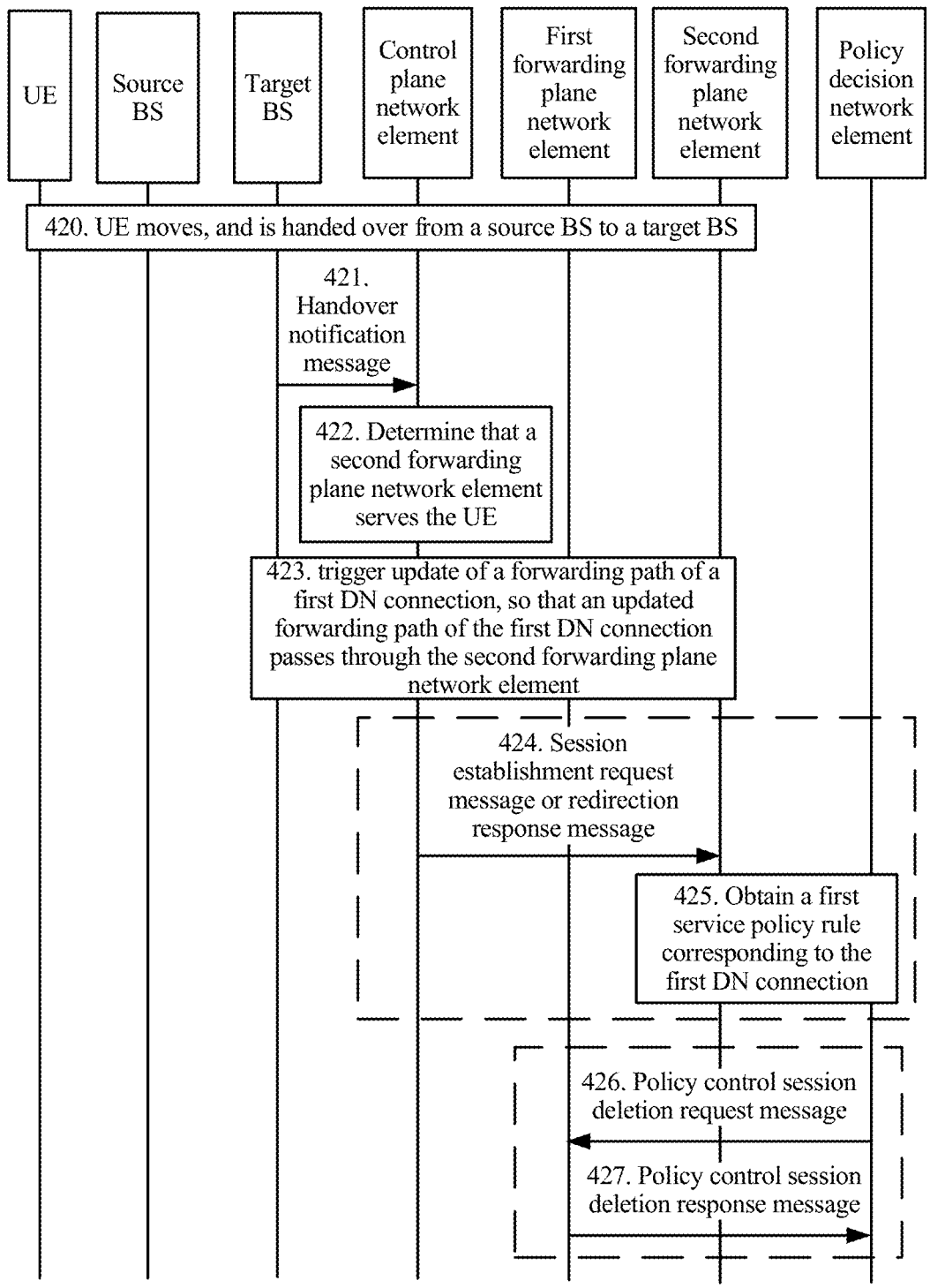
FIG. 9 is a signal flow diagram of a policy control method according to Embodiment 3 of the present disclosure.

FIG. 9 is a signal flow diagram of another policy control method according to an embodiment of the present disclosure. The method is mainly executed by UE, a BS, a control plane network element, a first forwarding plane network element, a second forwarding plane network element, and a policy decision network element. The control plane network element establishes, for the UE, a first DN connection that uses the first forwarding plane network element as an anchor. When the control plane network element receives a handover notification message for the UE and determines that the second forwarding plane network element serves the UE, a forwarding path is updated, and policy control session migration is performed. This embodiment is based on the system architecture shown in FIG. 3 and the application scenario shown in FIG. 5, that is, a policy control session is between a forwarding plane network element and the policy decision network element. In FIG. 9, a source BS is the BS1 in FIG. 5, a target BS is the BS2 in FIG. 5, the first forwarding plane network element is the forwarding plane network element 1 in FIG. 5, and the second forwarding plane network element is the forwarding plane network element 2 in FIG. 5. A specific scenario is described as follows: When the UE falls within coverage of the source BS, the control plane network element establishes, for the UE, the first DN connection that uses the first forwarding plane network element as an anchor, and when the UE is handed over to the target BS due to movement, the forwarding path of the first DN connection is updated, so that the UE accesses a DN by using the DN connection 2 shown in FIG. 5. For a specific policy control session migration process triggered in this scenario, refer to FIG. 9. The method includes the following steps.

Step 420. The UE moves, and is handed over from the source BS to the target BS.

Step 421. The control plane network element receives the handover notification message from the target BS.

Step 422. The control plane network element determines that the second forwarding plane network element serves the UE.

Step 423. The control plane network element triggers update of the forwarding path of the first DN connection, so that an updated forwarding path of the first DN connection passes through the second forwarding plane network element.

In an example, step 423 may specifically include the following: The control plane network element sends a session establishment request message to the second forwarding plane network element. The session establishment request message is used to: notify the second forwarding plane network element to establish a packet forwarding path that is between the second forwarding plane network element and the first forwarding plane network element and that is corresponding to the first DN connection, and notify the second forwarding plane network element to establish, by using the control plane network element, a packet forwarding path that is between the second forwarding plane network element and a base station serving the UE and that is corresponding to the first DN connection.

After step 423, the method further includes a process in which the second forwarding plane network element determines a first service policy rule corresponding to the first DN connection. The first service policy rule includes an indication identifier or tunnel information. The indication identifier or the tunnel information is used to notify the second forwarding plane network element to perform, based on an IP 5-tuple in a tunnel, flow detection on a downlink packet received from the first forwarding plane network element. The process in which the second forwarding plane network element determines the first service policy rule corresponding to the first DN connection may be implemented by using the following steps 424 and 425.

Step 424. The control plane network element sends a session establishment request message or a redirection response message to the second forwarding plane network element.

The session establishment request messages sent by the control plane network element to the second forwarding plane network element in step 423 and step 424 may be a same session establishment request message.

In addition, in this embodiment of the present disclosure, a second DN connection that uses the second forwarding plane network element as an anchor may further be established for the UE. Therefore, for ease of description, in a plurality of policy control sessions between the second forwarding plane network element and the policy decision network element, a signaling connection corresponding to the first DN connection is referred to as a first policy control session, the first policy control session is used to determine a service policy rule corresponding to the first DN connection, and the service policy rule is referred to as the first service policy rule. In the plurality of policy control sessions between the second forwarding plane network element and the policy decision network element, a signaling connection corresponding to the second DN connection is referred to as a second policy control session, the second policy control session is used to determine a service policy rule corresponding to the second DN connection, and the service policy rule is referred to as a second service policy rule. In the plurality of policy control sessions between the first forwarding plane network element and the policy decision network element, a signaling connection corresponding to the first DN connection is referred to as a third policy control session, the third policy control session is used to determine a service policy rule corresponding to the first DN connection, and the service policy rule is referred to as a third service policy rule.

Step 425. The second forwarding plane network element obtains, from the policy decision network element based on the session establishment request message or the redirection response message, a first service policy rule corresponding to the first DN connection.

A specific process is as follows: The second forwarding plane network element establishes a first policy control session between the second forwarding plane network element and the policy decision network element, and the second forwarding plane network element obtains, by using the first policy control session, the first service policy rule corresponding to the first DN connection.

This embodiment of the present disclosure further includes a process in which the first forwarding plane network element deletes the third service policy rule corresponding to the first DN connection. This process may be specifically implemented by using the following steps 426 and 427:

Step 426. The policy decision network element sends a policy control session deletion request message to the first forwarding plane network element, where the policy control session deletion request message is used to delete a third policy control session between the first forwarding plane network element and the policy decision network element.

Step 427. The first forwarding plane network element deletes a service policy rule related to the third policy control session, and sends a policy control session deletion response message to the policy decision network element.

Embodiment 4

Figure 10A:
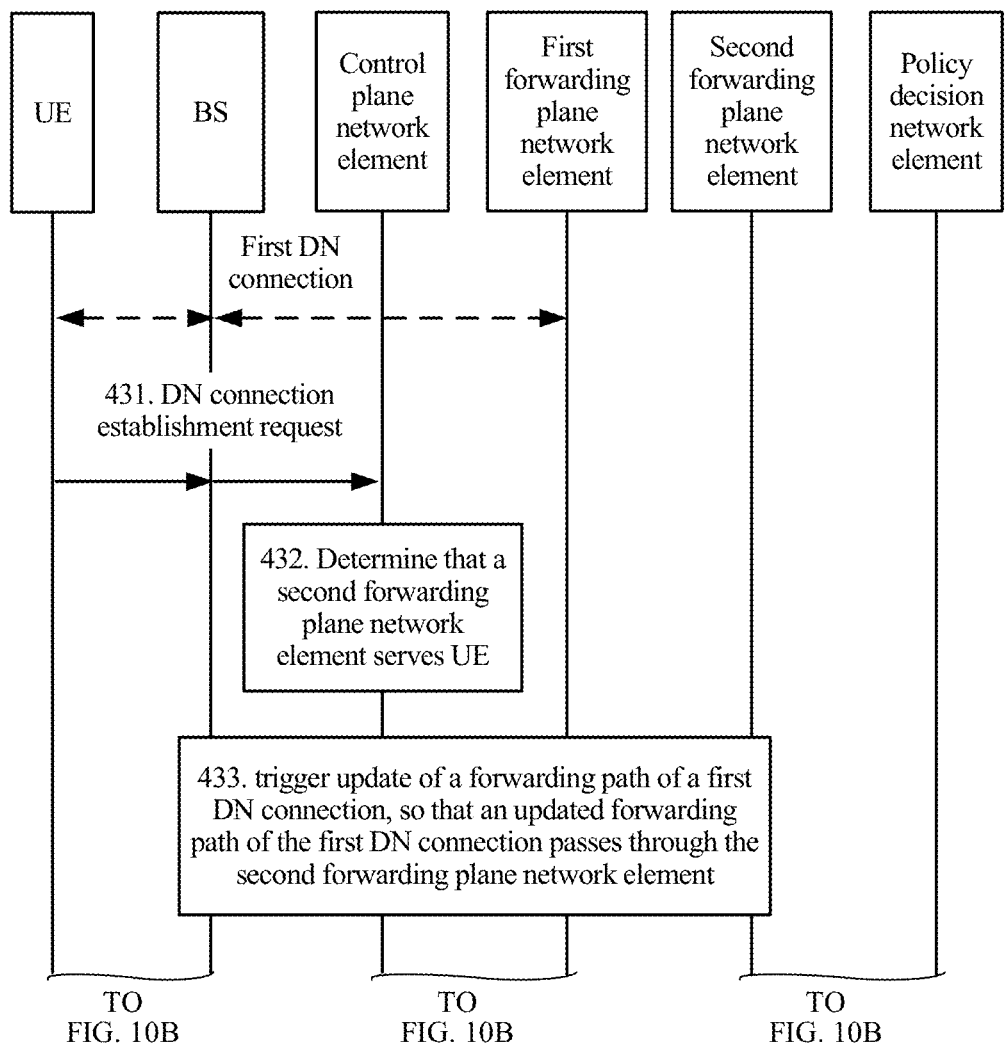
FIG. 10A and FIG. 10B are a signal flow diagram of a policy control method according to Embodiment 4 of the present disclosure.
Figure 10B:
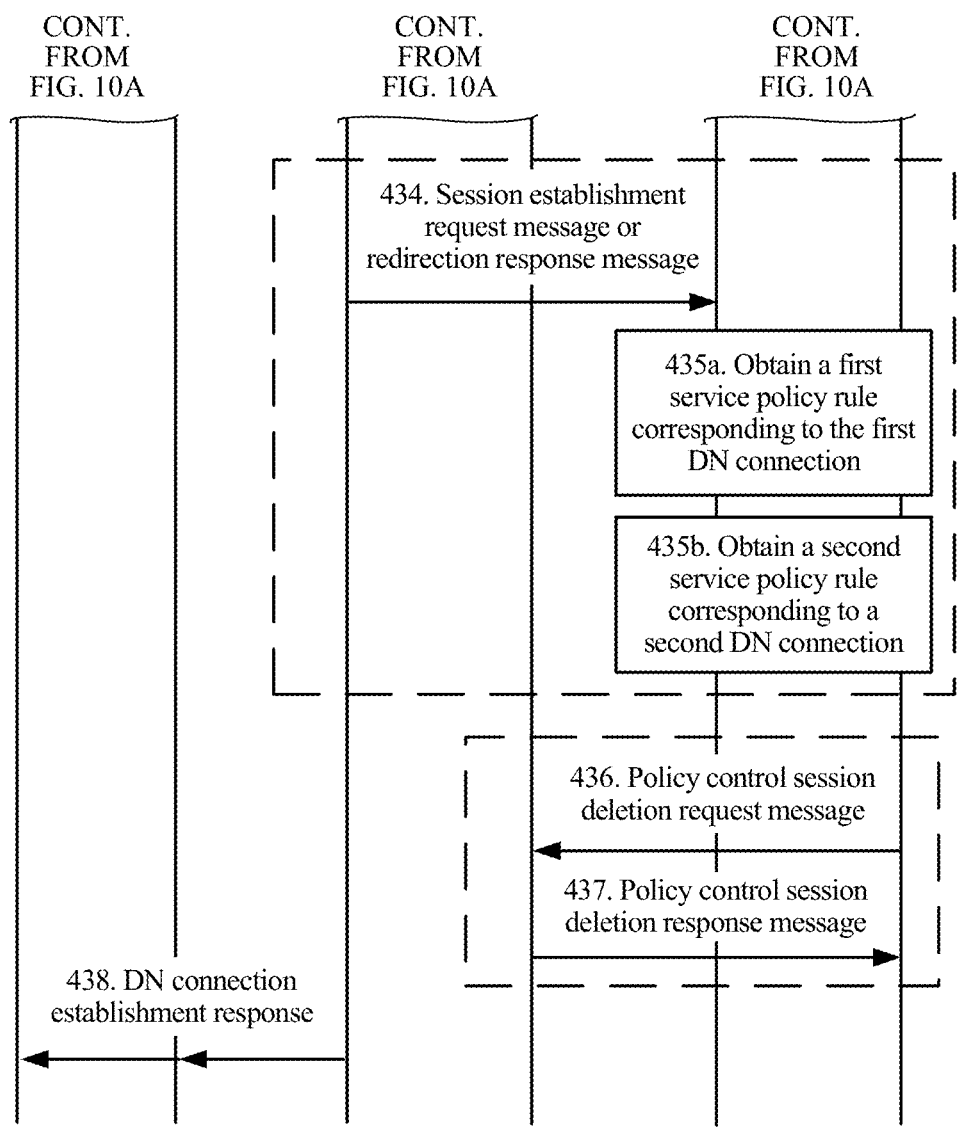

FIG. 10A and FIG. 10B are a signal flow diagram of another policy control method according to an embodiment of the present disclosure. The method is mainly executed by UE, a BS, a control plane network element, a first forwarding plane network element, a second forwarding plane network element, and a policy decision network element. The control plane network element establishes, for the UE, a first DN connection that uses the first forwarding plane network element as an anchor. When the control plane network element establishes, for the UE, a second DN connection that uses the second forwarding plane network element as an anchor, policy control session migration and forwarding path migration are performed. This embodiment is based on the system architecture shown in FIG. 3 and the application scenario shown in FIG. 5, that is, a policy control session is between a forwarding plane network element and the policy decision network element. In FIG. 10A and FIG. 10B, a source BS is the BS1 in FIG. 5, a target BS is the BS2 in FIG. 5, the first forwarding plane network element is the forwarding plane network element 1 in FIG. 5, and the second forwarding plane network element is the forwarding plane network element 2 in FIG. 5. A specific scenario is described as follows: When the UE falls within coverage of the source BS, the control plane network element establishes, for the UE, the first DN connection that uses the first forwarding plane network element as an anchor, and when the UE is handed over to the target BS due to movement, a forwarding path of the first DN connection is updated, so that the UE accesses a DN by using the DN connection 1 or the DN connection 2 that is shown in FIG. 5. For a specific policy control session migration process and/or a specific forwarding path migration process (a forwarding path migration process existing when the UE is handed over to the target BS due to movement and accesses the DN by using the DN connection 1 shown in FIG. 5) that are/is triggered in this scenario, refer to FIG. 10A and FIG. 10B. The method includes the following steps.

Step 431. The UE initiates a process of establishing the second DN connection, and sends a DN connection establishment request to the control plane network element by using the BS.

Step 432. The control plane network element determines that the second forwarding plane network element serves the UE.

Step 433. The control plane network element triggers update of the forwarding path of the first DN connection, so that an updated forwarding path of the first DN connection passes through the second forwarding plane network element.

In addition, the control plane network element may further establish a forwarding path of the second DN connection.

In an example, step 433 may specifically include the following: The control plane network element sends a session establishment request message to the second forwarding plane network element. The session establishment request message is used to: notify the second forwarding plane network element to establish a packet forwarding path that is between the second forwarding plane network element and the first forwarding plane network element and that is corresponding to the first DN connection, and notify the second forwarding plane network element to establish, by using the control plane network element, a packet forwarding path that is between the second forwarding plane network element and a base station serving the UE and that is corresponding to the first DN connection. The session establishment request message may further be used to notify the second forwarding plane network element to establish a packet forwarding path that is between the second forwarding plane network element and the base station serving the UE and that is corresponding to the second DN connection.

After step 433, the method further includes a process in which the second forwarding plane network element determines a first service policy rule corresponding to the first DN connection and a second service policy rule corresponding to the second DN connection. The first service policy rule includes an indication identifier or tunnel information. The indication identifier or the tunnel information is used to notify the second forwarding plane network element to perform, based on an IP 5-tuple in a tunnel, flow detection on a downlink packet received from the first forwarding plane network element. The process may be implemented by using the following steps 434 and 435.

For ease of description, in this embodiment, in a plurality of policy control sessions between the second forwarding plane network element and the policy decision network element, a signaling connection corresponding to the first DN connection is referred to as a first policy control session, the first policy control session is used to determine a service policy rule corresponding to the first DN connection, and the service policy rule is referred to as the first service policy rule. In the plurality of policy control sessions between the second forwarding plane network element and the policy decision network element, a signaling connection corresponding to the second DN connection is referred to as a second policy control session, the second policy control session is used to determine a service policy rule corresponding to the second DN connection, and the service policy rule is referred to as the second service policy rule. In a plurality of policy control sessions between the first forwarding plane network element and the policy decision network element, a signaling connection corresponding to the first DN connection is referred to as a third policy control session, the third policy control session is used to determine a service policy rule corresponding to the first DN connection, and the service policy rule is referred to as a third service policy rule.

Step 434. The control plane network element sends a session establishment request message or a redirection response message to the second forwarding plane network element.

The session establishment request messages sent by the control plane network element to the second forwarding plane network element in step 433 and step 434 may be a same session establishment request message.

Step 435. The second forwarding plane network element obtains, from the policy decision network element based on the session establishment request message or the redirection response message, a first service policy rule corresponding to the first DN connection and a second service policy rule corresponding to the second DN connection.

There are the following two specific implementations: The second forwarding plane network element establishes one policy control session between the second forwarding plane network element and the policy decision network element, to obtain, from the policy decision network element by using the policy control session, the first service policy rule corresponding to the first DN connection, and obtain, by using the policy control session, the second service policy rule corresponding to the second DN connection. Alternatively, the second forwarding plane network element establishes two policy control sessions between the second forwarding plane network element and the policy decision network element, to obtain, from the policy decision network element by using one of the two policy control sessions, the first service policy rule corresponding to the first DN connection, and obtain, by using the other policy control session, the second service policy rule corresponding to the second DN connection.

The second implementation is provided in the signal flow diagram shown in FIG. 10B, that is, a session establishment process between the second forwarding plane network element and the policy decision network element is specifically described as follows:

Step 435*a*. The second forwarding plane network element establishes a first policy control session between the second forwarding plane network element and the policy decision network element, to obtain the first service policy rule corresponding to the first DN connection.

Step 435*b*. The second forwarding plane network element establishes a second policy control session between the second forwarding plane network element and the policy decision network element, to obtain the second service policy rule corresponding to the second DN connection.

It should be noted that there is no strict execution sequence between step 435*a* and steps 435*b*.

For the first implementation, that is, when there is only one policy control session between the second forwarding plane network element and the policy decision network element, steps 435*a* and 435*b* in the signal flow diagram in FIG. 10B may be changed to the following processing process: The second forwarding plane network element establishes a policy control session between the second forwarding plane network element and the policy decision network element, and determines, by using the policy control session, the first service policy rule corresponding to the first DN connection and the second service policy rule corresponding to the second DN connection.

A specific process is described as follows:

The second forwarding plane network element sends a policy control session establishment request to the policy decision network element, where the request carries an identifier of the first DN connection and an identifier of the second DN connection.

The policy decision network element determines the first service policy rule corresponding to the first DN connection and the second service policy rule corresponding to the second DN connection, and sends a policy control session establishment response message to the second forwarding plane network element, where the message carries the first service policy rule and the second service policy rule.

For the first implementation, that is, when there is only one policy control session between the second forwarding plane network element and the policy decision network element, steps 435*a* and 435*b* in the signal flow diagram in FIG. 10B may be alternatively changed to the following processing process: The second forwarding plane network element establishes a policy control session between the second forwarding plane network element and the policy decision network element, and determines, by using the policy control session, the first service policy rule corresponding to the first DN connection. A specific process is described as follows: The second forwarding plane network element sends a policy control session establishment request to the policy decision network element, where the request carries an identifier of the first DN connection; and the policy decision network element determines the first service policy rule corresponding to the first DN connection, and sends a policy control session establishment response message to the second forwarding plane network element, where the message carries the first service policy rule. The second forwarding plane network element sends a policy control session request message to the policy decision network element, where the message carries an identifier of the second DN connection. The policy decision network element determines the second service policy rule corresponding to the second DN connection, and sends a policy control session response message to the second forwarding plane network element, where the message carries the second service policy rule.

For the first implementation, that is, when there is only one policy control session between the second forwarding plane network element and the policy decision network element, steps 435*a* and 435*b* in the signal flow diagram in FIG. 10B may be alternatively changed to the following processing process: The second forwarding plane network element establishes a policy control session between the second forwarding plane network element and the policy decision network element, and determines, by using the policy control session, the second service policy rule corresponding to the second DN connection. A specific process is described as follows: The second forwarding plane network element sends a policy control session establishment request to the policy decision network element, where the request carries an identifier of the second DN connection; and the policy decision network element determines the second service policy rule corresponding to the second DN connection, and sends a policy control session establishment response message to the second forwarding plane network element, where the message carries the second service policy rule. The second forwarding plane network element sends a policy control session request message to the policy decision network element, where the message carries an identifier of the first DN connection. The policy decision network element determines the first service policy rule corresponding to the first DN connection, and sends a policy control session response message to the second forwarding plane network element, where the message carries the first service policy rule.

This embodiment of the present disclosure further includes a process in which the first forwarding plane network element deletes the third service policy rule corresponding to the first DN connection. This process may be specifically implemented by using the following steps 436 and 437:

Step 436. The policy decision network element sends a policy control session deletion request message to the first forwarding plane network element, where the policy control session deletion request message is used to delete a third policy control session between the first forwarding plane network element and the policy decision network element.

Step 437. The first forwarding plane network element sends a policy control session deletion response message to the policy decision network element.

Step 438. The control plane network element sends a DN connection establishment response to the UE by using the BS.

The following describes the policy control method provided in the present disclosure by using four specific embodiments. First, the four embodiments are generally described with reference to the system architectures in FIG. 3 and FIG. 4 and the application scenarios in FIG. 5 and FIG. 6.

In the embodiments of the present disclosure, a PDN is only used as an example for specific description, and is not intended to limit the present disclosure. The policy control method provided in the embodiments of the present disclosure is also applicable to another DN.

It should be noted that, the four embodiments are described by using an example in which a forwarding path between UE and a forwarding plane network element has a granularity of a bearer. The forwarding path may have a granularity of a device or a granularity of a session. Details are not described in the present disclosure. In addition, the four embodiments are described by using an example in which a policy control session is specifically a Gx session and an example in which a DN connection is specifically a PDN connection.

It should be additionally noted that, in the four embodiments, service policy rules corresponding to a plurality of PDN connections may be determined by using one policy control session, or a service policy rule corresponding to each PDN connection may be determined by using a policy control session corresponding to each PDN connection.

Embodiment 5: Scenario: As shown in FIG. 5, after UE is handed over due to movement, the UE is connected to a PDN by using a PDN connection 1. In this case, a Gx session 1 exists between a forwarding plane network element 1 and a policy decision network element. Solution: In a process in which the UE establishes a new PDN connection 3, Gx session migration and forwarding path update are performed. The UE is connected to the PDN network by using the PDN connection 3 that passes through the forwarding plane network element 2. The Gx session migration means migrating the Gx session 1 to a location of a Gx session 2, that is, migrating a policy control session between the forwarding plane network element 1 and the policy decision network element to a location between the forwarding plane network element 2 and the policy decision network element. The forwarding path update means updating a forwarding path between a target BS and the forwarding plane network element 1 to a forwarding path between the target BS and the forwarding plane network element 2 and a forwarding path between the forwarding plane network element 2 and the forwarding plane network element 1. The target BS may be specifically the BS2 in FIG. 5. In this embodiment of the present disclosure, the Gx session 1 is migrated to the location of the Gx session 2, and a bearer between the target BS and the forwarding plane network element 1 is migrated to a location between the target BS and the forwarding plane network element 2 and a location between the forwarding plane network element 2 and the forwarding plane network element 1. A Gx session 3 represents a policy control session that is between the forwarding plane network element 2 and the policy decision network element and that exists when the PDN connection 3 is established. The Gx session 2 and the Gx session 3 may be different policy control sessions, or may be a same policy control session.

Embodiment 6: Scenario: As shown in FIG. 5, after UE is handed over due to movement, the UE is connected to a PDN by using a PDN connection 2. In this case, a Gx session 1 exists between a forwarding plane network element 1 and a policy decision network element. Solution: In a process in which the UE establishes a new PDN connection 3, Gx session migration is performed. The Gx session migration means migrating the Gx session 1 to a location of a Gx session 2, that is, migrating a policy control session between the forwarding plane network element 1 and the policy decision network element to a location between a forwarding plane network element 2 and the policy decision network element. A Gx session 3 represents a policy control session that is between the forwarding plane network element 2 and the policy decision network element and that exists when the PDN connection 3 is established.

Embodiment 6 differs from Embodiment 5 in the scenario. In Embodiment 6, after the UE is handed over due to movement, the UE is connected to the PDN by using the PDN connection 2, and the PDN connection 2 passes through the forwarding plane network element 2. Therefore, only session migration needs to be performed, without performing bearer migration.

Embodiment 7: Scenario: As shown in FIG. 5, after UE is handed over due to movement, the UE is connected to a PDN by using a PDN connection 2. In a handover process, the UE accesses the PDN by using a forwarding plane network element 2 and a forwarding plane network element 1. Solution: In the handover process of the UE, Gx session migration is performed. The Gx session migration means migrating a Gx session 1 to a location of a Gx session 2, that is, migrating a policy control session between the forwarding plane network element 1 and a policy decision network element to a location between the forwarding plane network element 2 and the policy decision network element.

Embodiment 7 differs from Embodiments 5 and 6 in the solution. The solutions in Embodiment 5 and Embodiment 6 are to perform Gx session migration in the new PDN connection establishment process of the UE. The solution in Embodiment 7 is to perform Gx session migration in the handover process of the UE.

Embodiment 8: Scenario: As shown in FIG. 6, a Gx session is between a control plane network element and a policy decision network element. Descriptions are provided by using the following example: After UE is handed over due to movement, the UE visits a PDN by using a PDN connection 2. Solution: In a process in which the UE establishes a new PDN connection 3, a Gx session modification process is initiated.

Embodiments 5 to 7 are described by using an example in which a service policy rule corresponding to each PDN connection is determined by using a Gx session corresponding to each PDN connection. Embodiment 8 is described by using an example in which service policy rules corresponding to a plurality of PDN connections are determined by using one Gx session.

The following further describes Embodiments 5 to 8 of the present disclosure in detail with reference to signal flow diagrams.

Embodiment 5

Referring to the system architecture shown in FIG. 3 and the application scenario shown in FIG. 5, as shown in FIG. 5, after UE is handed over due to movement, the UE visits a PDN by using a PDN connection 1. In this embodiment, the PDN connection 1 is referred to as an original PDN connection, and a corresponding anchor is a forwarding plane network element 1, referred to as an original anchor. A PDN connection 3 is a new PDN connection established by the UE, and a corresponding anchor is a forwarding plane network element 2, referred to as a target anchor. A technical solution in this embodiment is as follows: In a new PDN connection establishment process of the UE, if determining that the anchor corresponding to the new PDN connection is different from the anchor corresponding to the original PDN connection, a control plane network element triggers a Gx session migration process and a bearer migration process.

Figure 11A:
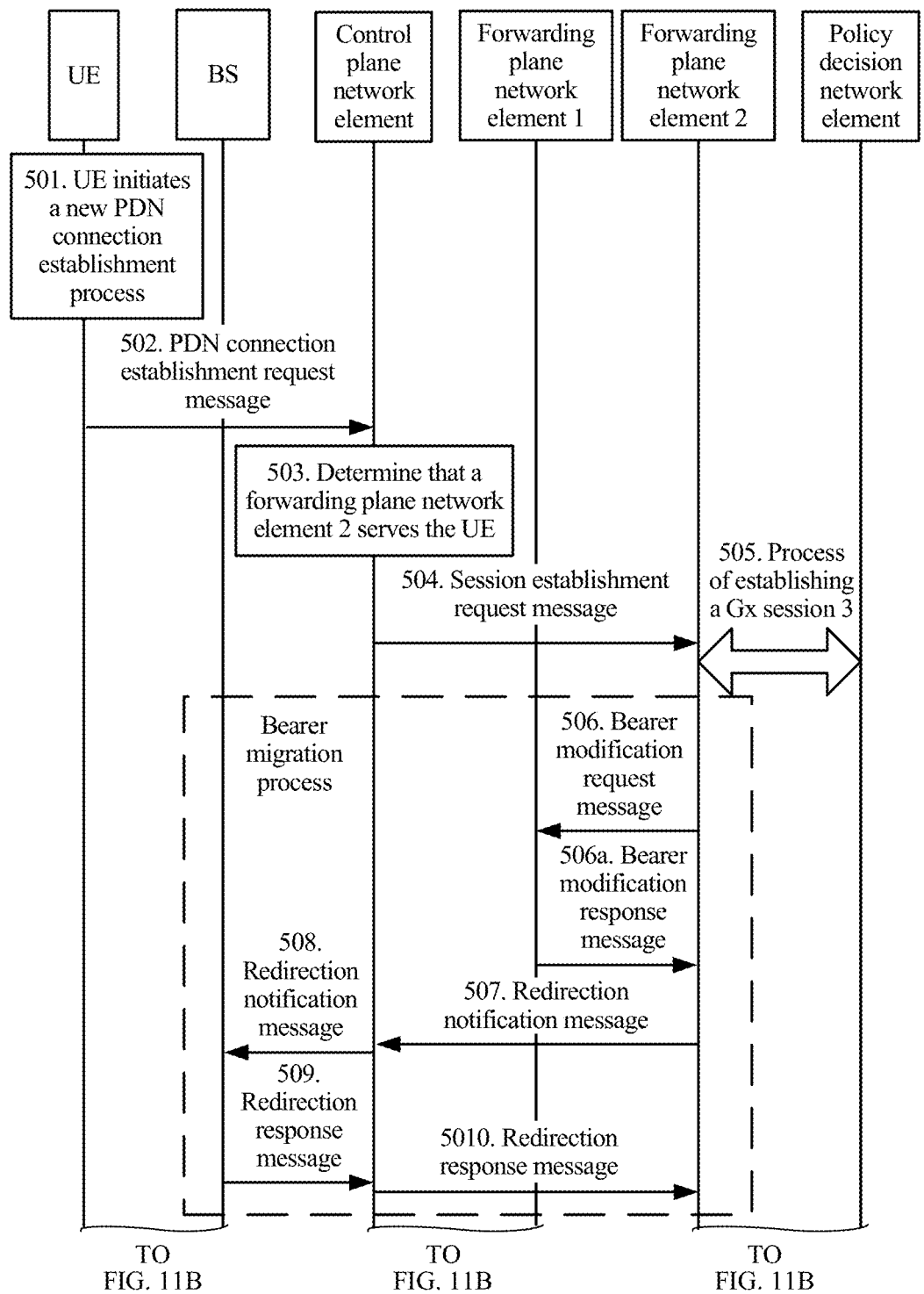
FIG. 11A and FIG. 11B are a signal flow diagram of a policy control method according to Embodiment 5 of the present disclosure.
Figure 11B:
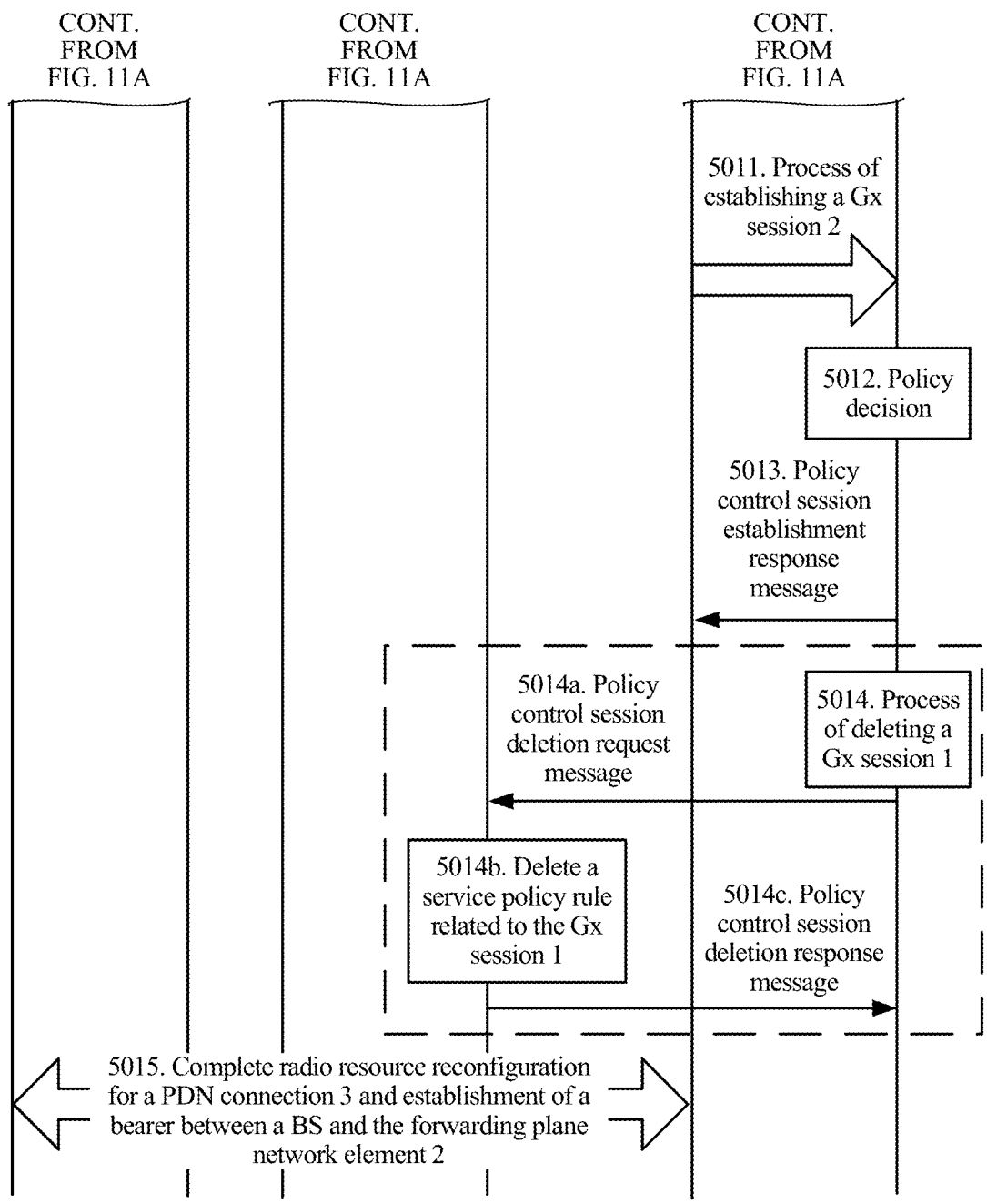

FIG. 11A and FIG. 11B are a signal flow diagram of a policy control method according to Embodiment 5 of the present disclosure. Referring to FIG. 11A and FIG. 11B, the method includes the following steps:

Step 501. The UE determines to initiate a new PDN connection establishment process.

The UE may determine, based on a correspondence that is between a PDN connection and location area information and is stored by the UE, to initiate new PDN connection establishment, that is, when a current location of the UE is not included in any location area indicated by the correspondence, a new PDN connection establishment condition is met.

The location area information may be a cell list, a tracking area list (TA list), a location area identifier, a base station identifier group, a physical location range, or the like.

Step 502. The UE sends a PDN connection establishment request message to the control plane network element by using a base station.

Step 503. The control plane network element determines that the forwarding plane network element 2 serves the UE.

The control plane network element may determine a forwarding plane network element based on current location information of the UE or a BS ID, and a service range of the forwarding plane network element.

Step 504. The control plane network element sends a session establishment request message to the forwarding plane network element 2.

When the control plane network element determines that the anchor corresponding to the new connection established by the UE is different from the anchor corresponding to the original PDN connection, the session establishment request message further carries an address of the original anchor and an identifier of the original PDN connection, namely, an address of the forwarding plane network element 1 and an identifier of the PDN connection 1, to instruct the forwarding plane network element 2 to perform Gx session migration and bearer migration for the original PDN connection, so that the UE is prevented from having a plurality of policy decision enforcement points.

Step 505. The forwarding plane network element 2 initiates a process of establishing a policy control session between the forwarding plane network element 2 and a policy decision network element, namely, a process of establishing a Gx session 3 corresponding to the PDN connection 3.

In the process of establishing the Gx session 3, the policy decision network element determines a service policy rule corresponding to the PDN connection 3, and sends the service policy rule to the forwarding plane network element 2. A specific process is described as follows: The forwarding plane network element 2 sends a policy control session establishment request message to the policy decision network element, where the message carries a connection identifier of the PDN connection 3; and the policy decision network element determines the service policy rule corresponding to the PDN connection 3, and sends a policy control session establishment response message to the forwarding plane network element 2, where the message carries the service policy rule corresponding to the PDN connection 3. The service policy rule corresponding to the PDN connection 3 is used to instruct the forwarding plane network element 2 to process a packet on the PDN connection 3.

Step 506. The forwarding plane network element 2 sends a bearer modification request message to the forwarding plane network element 1 based on the session establishment request message received in step 504.

The bearer modification request message carries a tunnel endpoint identifier (TEID) of the forwarding plane network element 2 and the connection identifier of the PDN connection 1.

It should be noted that there is no execution sequence between step 506 and step 505. Step 505 and step 506 may be performed simultaneously. This is not limited in this embodiment of the present disclosure.

Step 506a. The forwarding plane network element 1 sends a bearer modification response message to the forwarding plane network element 2, where the message carries a tunnel endpoint identifier of the forwarding plane network element 1 and a connection identifier of the PDN connection 1.

Steps 507 and 508. The forwarding plane network element 2 sends a forwarding plane network element redirection notification message to the BS by using the control plane network element, where the message carries a tunnel endpoint identifier of the forwarding plane network element 2 and the connection identifier of the PDN connection 1.

Steps 509 and 5010. The BS sends a redirection response message to the forwarding plane network element 2 by using the control plane network element, where the message carries a tunnel endpoint identifier of the BS and the connection identifier of the PDN connection 1.

Step 5011. After receiving the redirection response message, the forwarding plane network element 2 initiates a process of establishing a policy control session between the forwarding plane network element 2 and the policy decision network element, namely, a process of establishing a Gx session 2 corresponding to the PDN connection 1. Specifically, the forwarding plane network element 2 sends a policy control session establishment request message to the policy decision network element, where the message carries the connection identifier of the PDN connection 1.

Steps 5012 and 5013. The policy decision network element determines a service policy rule corresponding to the PDN connection 1, and sends a policy control session establishment response message to the forwarding plane network element 2, where the message carries the service policy rule corresponding to the PDN connection 1. The service policy rule corresponding to the PDN connection 1 is used to instruct the forwarding plane network element 2 to process a packet on the PDN connection 1.

The service policy rule corresponding to the PDN connection 1 includes an indication identifier or tunnel information. The indication identifier or the tunnel information is used to instruct the forwarding plane network element 2 to perform, based on an IP 5-tuple in a tunnel, flow detection on a downlink packet from the forwarding plane network element 1.

The tunnel information may be the tunnel endpoint identifier of the forwarding plane network element 2.

It should be noted that, in this embodiment, a service policy rule corresponding to each PDN connection is determined by using a policy control session corresponding to each PDN connection, that is, the service policy rule corresponding to the PDN connection 3 is determined in step 505, and the service policy rule corresponding to the PDN connection 1 is determined in steps 5011 to 5013. When service policy rules corresponding to a plurality of PDN connections are determined by using one policy control session, that is, when the Gx session 2 and the Gx session 3 are a same Gx session, the policy control session establishment process shown in steps 5011 to 5013 should be changed to a service policy rule obtaining process. A specific process is described as follows:

The forwarding plane network element 2 sends a policy control session request message to the policy decision network element, where the message carries the connection identifier of the PDN connection 1, and optionally carries the connection identifier of the PDN connection 3.

The policy decision network element determines a service policy rule corresponding to the PDN connection 1, and sends a policy control session response message to the forwarding plane network element 2, where the message carries the service policy rule corresponding to the PDN connection 1. The service policy rule corresponding to the PDN connection 1 includes an indication identifier or tunnel information. The indication identifier or the tunnel information is used to instruct the forwarding plane network element 2 to perform, based on an IP 5-tuple in a tunnel, flow detection on a downlink packet from the forwarding plane network element 1. Optionally, the policy decision network element further determines the service policy rule corresponding to the PDN connection 3. In this case, the policy control session response message further carries the service policy rule corresponding to the PDN connection 3.

Step 5014. The policy decision network element initiates a process of deleting a policy control session between the forwarding plane network element 1 and the policy decision network element, namely, a process of deleting a Gx session 1.

The process of deleting the Gx session 1 may specifically include the following steps:

Step 5014*a*. The policy decision network element sends a policy control session deletion request message to the forwarding plane network element 1, where the message carries the connection identifier of the PDN connection 1.

Steps 5014*b* and 5014*c*. The forwarding plane network element 1 deletes a service policy rule related to the PDN connection 1, and sends a policy control session deletion response message to the policy decision network element.

The process of deleting the Gx session 1 may be any step performed after step 5011. This is not limited in this embodiment of the present disclosure.

Step 5015. The forwarding plane network element 2, the control plane network element, the BS, and the UE perform signaling interaction mutually, to complete radio resource reconfiguration for the PDN connection 3 and establishment of a bearer between the BS and the forwarding plane network element 2.

A specific process of step 5015 may be described as follows:

Step 5015*a*. The forwarding plane network element 2 sends a session establishment response message to the control plane network element, where the session establishment response message includes the tunnel endpoint identifier of the forwarding plane network element 2.

Step 5015*a* is a response to step 504.

Step 5015*b*. The control plane network element sends a bearer establishment request message to the BS, where the bearer establishment request message carries the tunnel endpoint identifier of the forwarding plane network element 2.

Steps 5015*c* and 5015*d*. The BS initiates a radio resource reconfiguration process between the BS and the UE.

Step 5015*e*. The BS sends a bearer establishment response message to the control plane network element, where the bearer establishment response message carries the BS TEID.

Steps 5015*f* and 5015*g*. The UE sends a PDN connection establishment complete message to the control plane network element by using the BS.

Steps 5015*h* and 5015*i*. The control plane network element sends a bearer modification request message to the forwarding plane network element 2, where the bearer modification request message includes the parameter BS TEID; and the forwarding plane network element 2 sends a bearer modification response message to the control plane network element.

The process described in step 5015 belongs to the prior art, and details are not described herein.

A scenario described in this embodiment of the present disclosure is as follows: After the UE is handed over due to movement, the UE is connected to the original forwarding plane network element 1 by using a target BS, to be connected to the PDN. When the UE initiates new PDN connection establishment, if the control plane network element determines that the anchor corresponding to the new PDN connection is different from the anchor corresponding to the original PDN connection, to prevent the UE from having a plurality of policy enforcement points, bearer migration and Gx session migration are performed, so that all PDN connections pass through a same forwarding plane network element, and policy control is performed by using the forwarding plane network element.

For a scenario in which the UE has a plurality of policy enforcement points, the prior art provides no specific solution for how to resolve the following problem: Policy control cannot be performed at a granularity of UE or at a granularity of an APN because service flow paths are dispersed. In this embodiment of the present disclosure, in the new PDN connection establishment process, policy control session migration and forwarding path migration are performed, so that all PDN connections pass through a same forwarding plane network element, and policy control is performed on packets of the UE by using the forwarding plane network element.

Embodiment 6

Referring to the system architecture shown in FIG. 3 and the application scenario shown in FIG. 5, after UE is handed over due to movement, the UE visits a PDN by using a PDN connection 2. In this embodiment of the present disclosure, the PDN connection 2 is referred to as an original PDN connection, and a corresponding anchor is a forwarding plane network element 1, referred to as an original anchor. A PDN connection 3 is a new PDN connection established by the UE, and a corresponding anchor is a forwarding plane network element 2, referred to as a target anchor.

A technical solution in this embodiment is as follows: In a new PDN connection establishment process of the UE, if determining that the anchor corresponding to the newly-established PDN connection is different from the anchor corresponding to the original PDN connection and the original PDN connection passes through the anchor corresponding to the newly-established PDN connection, a control plane network element triggers policy control session migration, to migrate a policy control session between the forwarding plane network element 1 and a policy decision network element to a location between the forwarding plane network element 2 and the policy decision network element.

In FIG. 3, a Gx session 1 is a policy control session corresponding to the original PDN connection (namely, the PDN connection 2), namely, the policy control session between the forwarding plane network element 1 and the policy decision network element. A Gx session 2 is a policy control session that is corresponding to the original PDN connection and that exists after Gx session migration. A Gx session 3 is a policy control session corresponding to the newly-established PDN connection (namely, the PDN connection 3), namely, a policy control session between the forwarding plane network element 2 and the policy decision network element.

Figure 12A:
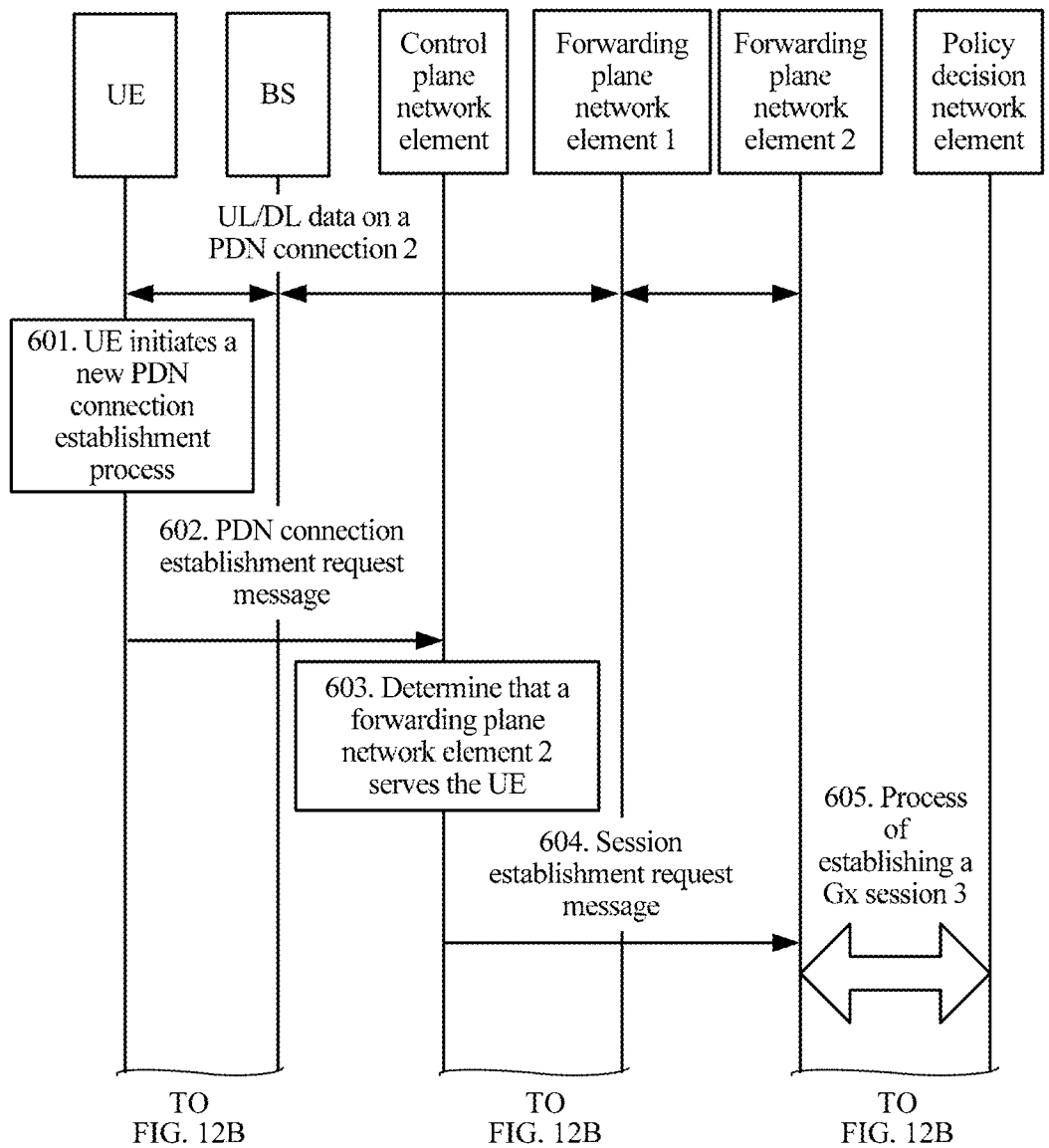
FIG. 12A and FIG. 12B are a signal flow diagram of a policy control method according to Embodiment 6 of the present disclosure.
Figure 12B:
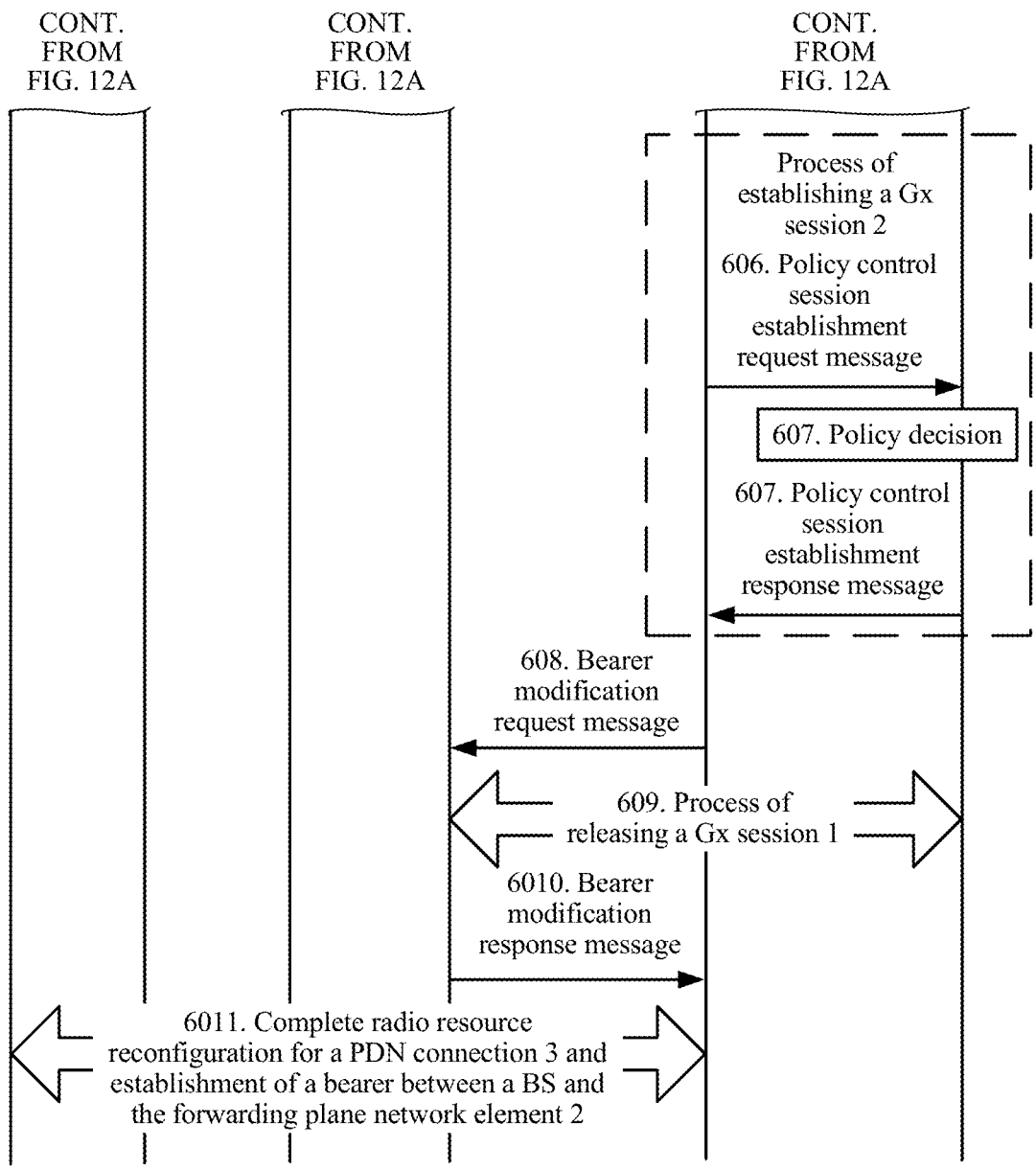

A specific process of this embodiment is shown in FIG. 12A and FIG. 12B. Referring to FIG. 12A and FIG. 12B, a policy control method includes the following steps.

Step 601. The UE initiates a new PDN connection establishment process.

The UE may determine, based on a correspondence that is between a PDN connection and location area information and is stored by the UE, to initiate new PDN connection establishment. That is, when a current location of the UE is not included in any location area indicated by the correspondence, a new PDN connection establishment condition is met. The location area information may be a cell list, a tracking area list, a location area identifier, a base station identifier group, a physical location range, or the like.

Step 602. The UE sends a PDN connection establishment request message to the control plane network element by using a base station.

Step 603. The control plane network element determines that the forwarding plane network element 2 serves the UE.

The control plane network element may determine a forwarding plane network element based on current location information of the UE or a BS ID, and a service range of the forwarding plane network element.

Step 604. The control plane network element sends a session establishment request message to the forwarding plane network element 2.

When the control plane network element determines that the anchor corresponding to the new connection is different from the anchor corresponding to the original PDN connection, the session establishment request message includes a connection identifier of the original PDN connection, to instruct the forwarding plane network element 2 to initiate a process of establishing a policy control session corresponding to the original PDN connection.

This embodiment is also applicable to a case in which there are a plurality of PDN connections. This embodiment is described by using only two PDN connections (one of which is the original PDN connection) as an example.

When a service policy rule corresponding to each PDN connection is determined by using a policy control session corresponding to each PDN connection, after receiving the session establishment request message from the control plane network element, the forwarding plane network element 2 initiates a process of establishing two policy control sessions between the forwarding plane network element 2 and the policy decision network element. The two policy control sessions are respectively the policy control session (namely, the Gx session 3) corresponding to the PDN connection 3 and the policy control session (namely, the Gx session 2) corresponding to the PDN connection 2. A specific process is described in steps 605 to 607:

Step 605. The forwarding plane network element 2 initiates a process of establishing the Gx session 3.

The forwarding plane network element 2 sends a policy control session establishment request message to the policy decision network element, where the message carries a connection identifier of the PDN connection 3. The policy decision network element determines a service policy rule corresponding to the PDN connection 3, and sends a policy control session establishment response message to the forwarding plane network element 2, where the message carries the service policy rule corresponding to the PDN connection 3.

Step 606. The forwarding plane network element 2 initiates a process of establishing the Gx session 2, and sends a policy control session establishment request message to the policy decision network element, where the message carries a connection identifier of a PDN connection 2.

Steps 607. The policy decision network element determines a service policy rule corresponding to the PDN connection 2, and sends a policy control session establishment response message to the forwarding plane network element 2, where the message carries the service policy rule corresponding to the PDN connection 2.

The service policy rule corresponding to the PDN connection 2 includes an indication identifier or tunnel information. The indication identifier or the tunnel information is used to instruct the forwarding plane network element 2 to perform, based on an IP 5-tuple in a tunnel, flow detection on a downlink packet from the forwarding plane network element 1.

It should be noted that there is no sequence between the process of establishing the Gx session 3 and the process of establishing the Gx session 2, that is, there is no execution sequence between step 605 and steps 606 and 607.

Optionally, the method further includes the following steps:

Step 608. The forwarding plane network element 2 sends a bearer modification request message to the forwarding plane network element 1.

The bearer modification request message is used to notify the forwarding plane network element 1 that migration of the Gx session 1 has been completed, and the Gx session 1 is the policy control session between the forwarding plane network element 1 and the policy decision network element.

Step 609. The forwarding plane network element 1 initiates a process of releasing the Gx session 1.

In this embodiment of the present disclosure, the process that is of releasing the Gx session 1 and is described in step 609 may be initiated by the policy decision network element. When the process is initiated by the policy decision network element, this step may be any step performed after step 606. This is not limited in the present disclosure.

Optionally, as a response to step 608, the method may further include the following step:

Step 6010. The forwarding plane network element 1 sends a bearer modification response message to the forwarding plane network element 2.

Step 6011. Complete radio resource reconfiguration for the PDN connection 3 and establishment of a bearer between the BS and the forwarding plane network element 2.

In this embodiment of the present disclosure, when service policy rules corresponding to a plurality of PDN connections are determined by using one policy control session, steps 605 to 607 are replaced with the following processing process:

The forwarding plane network element 2 initiates a process of establishing the Gx session 3. A specific process is described as follows:

The forwarding plane network element 2 sends a policy control session establishment request message to the policy decision network element, where the message carries the connection identifier of the PDN connection 2 and a connection identifier of the PDN connection 3.

The policy decision network element determines a service policy rule corresponding to the PDN connection 2 and a service policy rule corresponding to the PDN connection 3, and sends a policy control session establishment response message to the forwarding plane network element 2, where the message carries the service policy rule corresponding to the PDN connection 2 and the service policy rule corresponding to the PDN connection 3. The service policy rule corresponding to the PDN connection 2 is used to instruct the forwarding plane network element 2 to perform policy control on a packet on the PDN connection 2. The service policy rule corresponding to the PDN connection 3 is used to instruct the forwarding plane network element 2 to perform policy control on a packet on the PDN connection 3. The service policy rule corresponding to the PDN connection 2 carries an indication identifier or tunnel information. The indication identifier or the tunnel information is used to instruct the forwarding plane network element 2 to perform, based on an IP 5-tuple in a tunnel, flow detection on a downlink packet from the forwarding plane network element 1. The tunnel information may be a TEID of the forwarding plane network element 2.

A scenario described in this embodiment is as follows: After the UE is handed over due to movement, the UE is connected to the original forwarding plane network element 1 by using a target BS and the target forwarding plane network element 2, to be connected to the PDN. When the UE initiates new PDN connection establishment, if the control plane network element determines that the anchor corresponding to the new PDN connection is different from the anchor corresponding to the original PDN connection, to prevent the UE from having a plurality of policy enforcement points, Gx session migration is performed, so that it is ensured that all PDN connections pass through a same forwarding plane network element, and policy control is performed by using the forwarding plane network element. Therefore, the following case is avoided: Policy control cannot be performed at a granularity of UE or at a granularity of an APN because service flow paths are dispersed.

An improvement that differs the solution in the present disclosure from the prior art is as follows: Gx session migration is performed in the new PDN connection establishment process of the UE.

Embodiment 7

Referring to the system architecture shown in FIG. 3 and the application scenario shown in FIG. 5, in a handover process of UE, if determining that a new forwarding plane network element serves the UE, a control plane network element triggers a Gx session migration process.

Figure 13A:
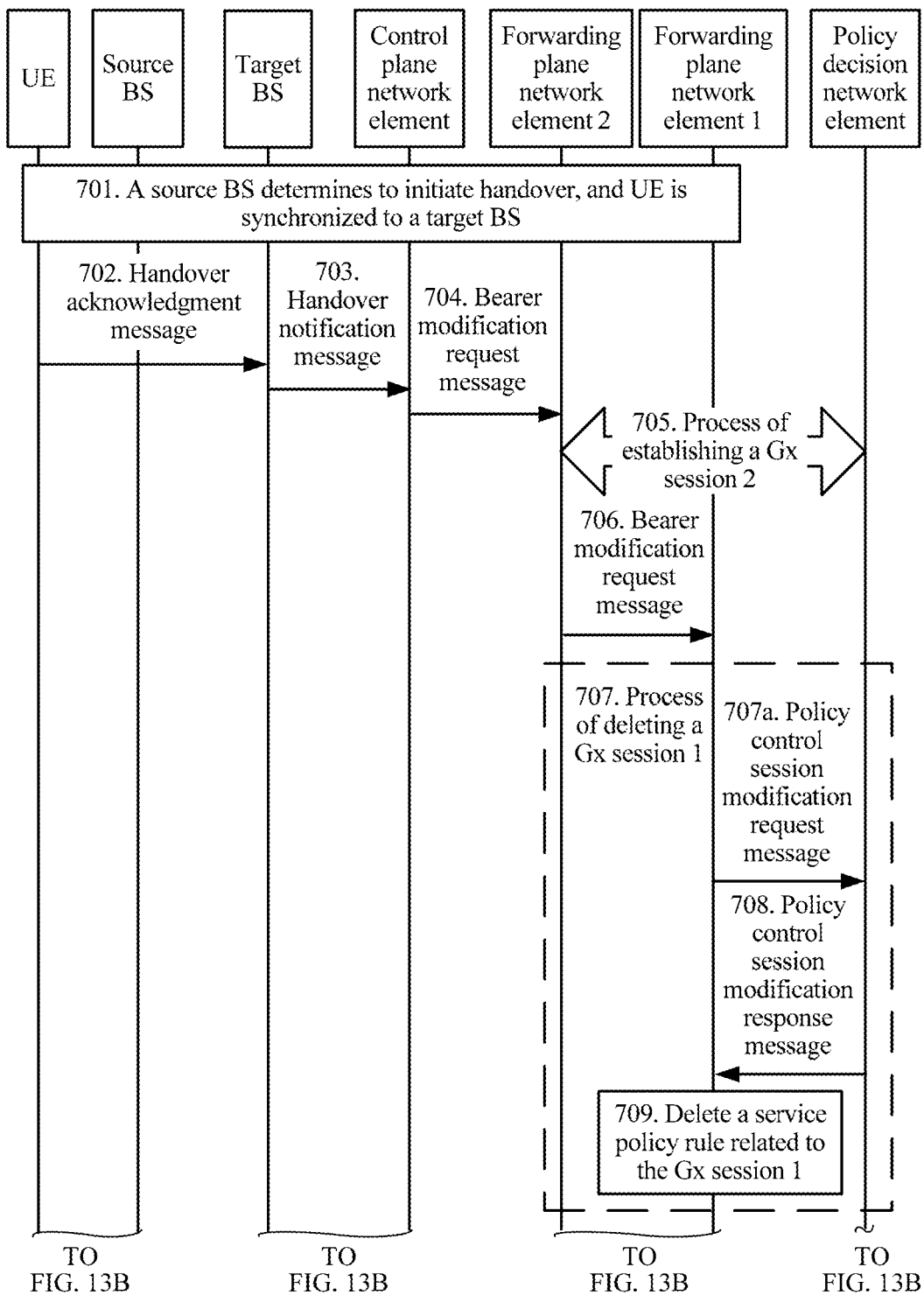
FIG. 13A and FIG. 13B are a signal flow diagram of a policy control method according to Embodiment 7 of the present disclosure.
Figure 13B:
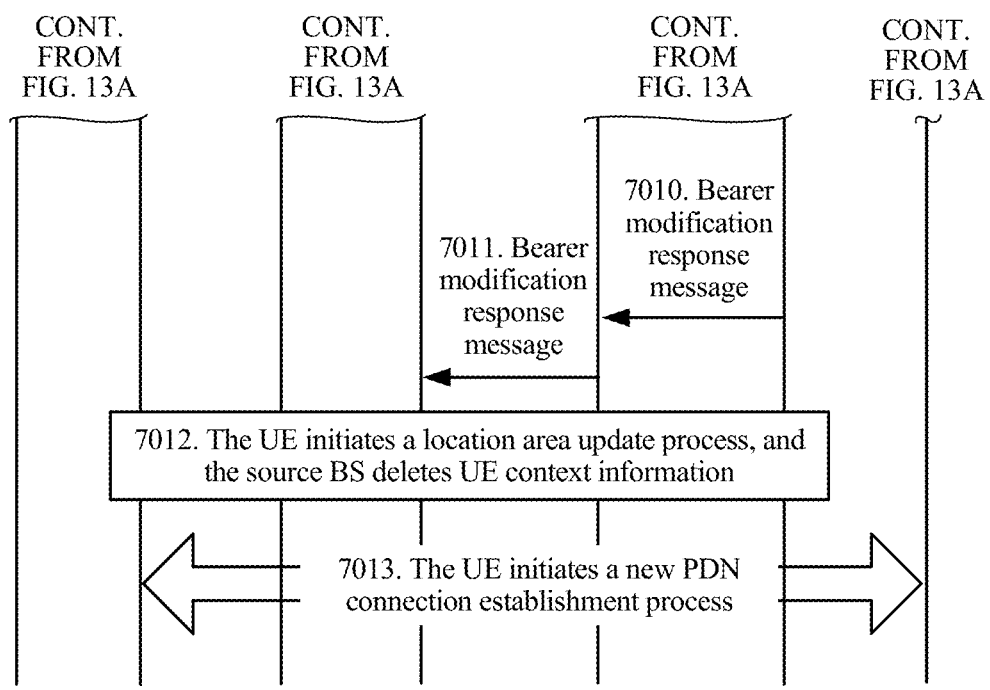

A specific process of this embodiment is shown in FIG. 13A and FIG. 13B.

Referring to FIG. 13A and FIG. 13B, a policy control method includes the following steps.

Step 701. A source BS initiates handover, and the UE is synchronized to a target BS.

Step 702. The UE sends a handover acknowledgment message to the target BS.

The handover acknowledgement message is used to indicate that the UE is successfully synchronized to the target BS.

Step 703. The target BS sends a handover notification message to the control plane network element.

Step 704. The control plane network element determines that a forwarding plane network element 2 with a better location serves the UE, and sends a bearer modification request message to the forwarding plane network element 2.

The bearer modification request message includes an IP address of the target BS and a TEID of the target BS.

Step 705. The forwarding plane network element 2 initiates a process of establishing a Gx session 2.

Specifically, the forwarding plane network element 2 sends a policy control session establishment request message to a policy decision network element.

The policy decision network element determines a service policy rule corresponding to a PDN connection 2, and sends a policy control session establishment response message to the forwarding plane network element 2, where the message carries the service policy rule corresponding to the PDN connection 2.

The service policy rule corresponding to the PDN connection 2 includes an indication identifier or tunnel information. The indication identifier or the tunnel information is used to instruct the forwarding plane network element 2 to perform, based on an IP 5-tuple in a tunnel, flow detection on a downlink packet from a forwarding plane network element 1.

Step 706. The forwarding plane network element 2 sends a bearer modification request message to a forwarding plane network element 1, where the message carries a TEID of the forwarding plane network element 2.

There is no strict execution sequence between step 705 and step 706. Step 705 and step 706 may be performed simultaneously. This is not limited in the present disclosure.

Step 707. After receiving the bearer modification request message from the forwarding plane network element 2, the forwarding plane network element 1 initiates a process of deleting a Gx session 1.

A specific process may be described as follows:

Step 707a. The forwarding plane network element 1 sends a policy control session modification request message to a policy decision network element.

Step 708. The policy decision network element sends a policy control session modification response message to the forwarding plane network element 1.

Step 709. The forwarding plane network element 1 deletes, based on the received policy control session modification response message, a service policy rule related to the Gx session 1.

Step 7010. The forwarding plane network element 1 sends a bearer modification response message to the forwarding plane network element 2.

The bearer modification response message is a response message of step 706.

Step 7011. The forwarding plane network element 2 sends a bearer modification response message to the control plane network element.

The bearer modification response message is a response message of step 704, and includes an IP address of the forwarding plane network element 2 and the TEID of the forwarding plane network element 2.

Step 7012. When a tracking area update TAU condition is met, the UE initiates a TAU process.

Optionally, the method further includes the following step:

Step 7013. The UE initiates a process of establishing a new PDN connection 3.

In the process of establishing the PDN connection 3, the control plane network element determines that the forwarding plane network element 2 serves the UE, and the forwarding plane network element 2 initiates a process of establishing a Gx session 3 between the forwarding plane network element 2 and the policy decision network element. The policy decision network element performs policy decision, and delivers, to the forwarding plane network element 2, a service policy rule corresponding to the newly-established PDN connection.

When service policy rules corresponding to a plurality of PDN connections are determined by using one policy control session, in the process (step 7013) that is of establishing the new PDN connection 3 and is initiated by the UE, the forwarding plane network element 2 initiates a service policy rule obtaining process to the policy decision network element, to determine the service policy rule corresponding to the PDN connection 3.

A scenario described in this embodiment is as follows: When the UE is handed over due to movement, the UE is connected to the original forwarding plane network element 1 by using the target BS and the target forwarding plane network element 2, to be connected to a PDN. During handover of the UE, when the control plane network element determines that a new forwarding plane network element with a better location serves the UE, the new forwarding plane network element initiates a policy control session migration process, so that a policy control enforcement point of a PDN connection is located at the forwarding plane network element with the better location.

An improvement that differs the solution in Embodiment 7 of the present disclosure from the prior art is as follows: In the handover process of the UE, the policy control session migration process is executed, so that the policy enforcement point is migrated to the forwarding plane network element with the better location.

Embodiment 8

Referring to the system architecture shown in FIG. 4 and the application scenario shown in FIG. 6, this embodiment is described by using the following example: After UE is handed over due to movement, the UE accesses a PDN by using a PDN connection 2. In addition, in this embodiment, a policy control session is between a control plane network element and a policy decision network element, and service policy rules corresponding to a plurality of PDN connections are determined by using one policy control session.

As shown in FIG. 6, the PDN connection 2 is a PDN connection existed after the UE is handed over due to movement. In this embodiment, the PDN connection 2 is referred to as an original PDN connection, and a corresponding anchor is a forwarding plane network element 1, referred to as an original anchor. A PDN connection 3 is a new PDN connection established by the UE, and a corresponding anchor is a forwarding plane network element 2, referred to as a target anchor.

A technical solution in this embodiment is as follows: In a new PDN connection establishment process of the UE, if the control plane network element determines that the anchor corresponding to the new PDN connection established by the UE is different from the original anchor, to prevent the UE from having a plurality of policy enforcement points, the control plane network element executes a policy control session migration process, to migrate a policy enforcement point to the anchor corresponding to the newly-established PDN connection.

Figure 14A:
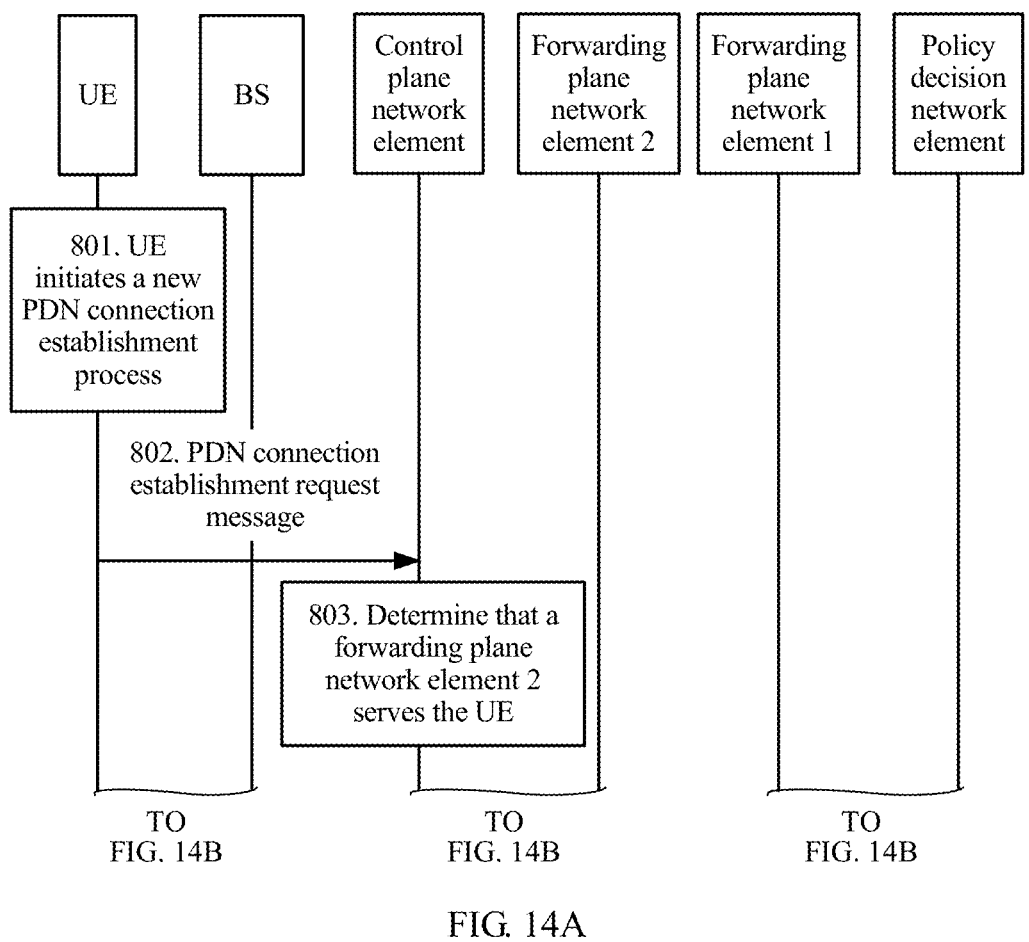
FIG. 14A and FIG. 14B are a signal flow diagram of a policy control method according to Embodiment 8 of the present disclosure.
Figure 14B:
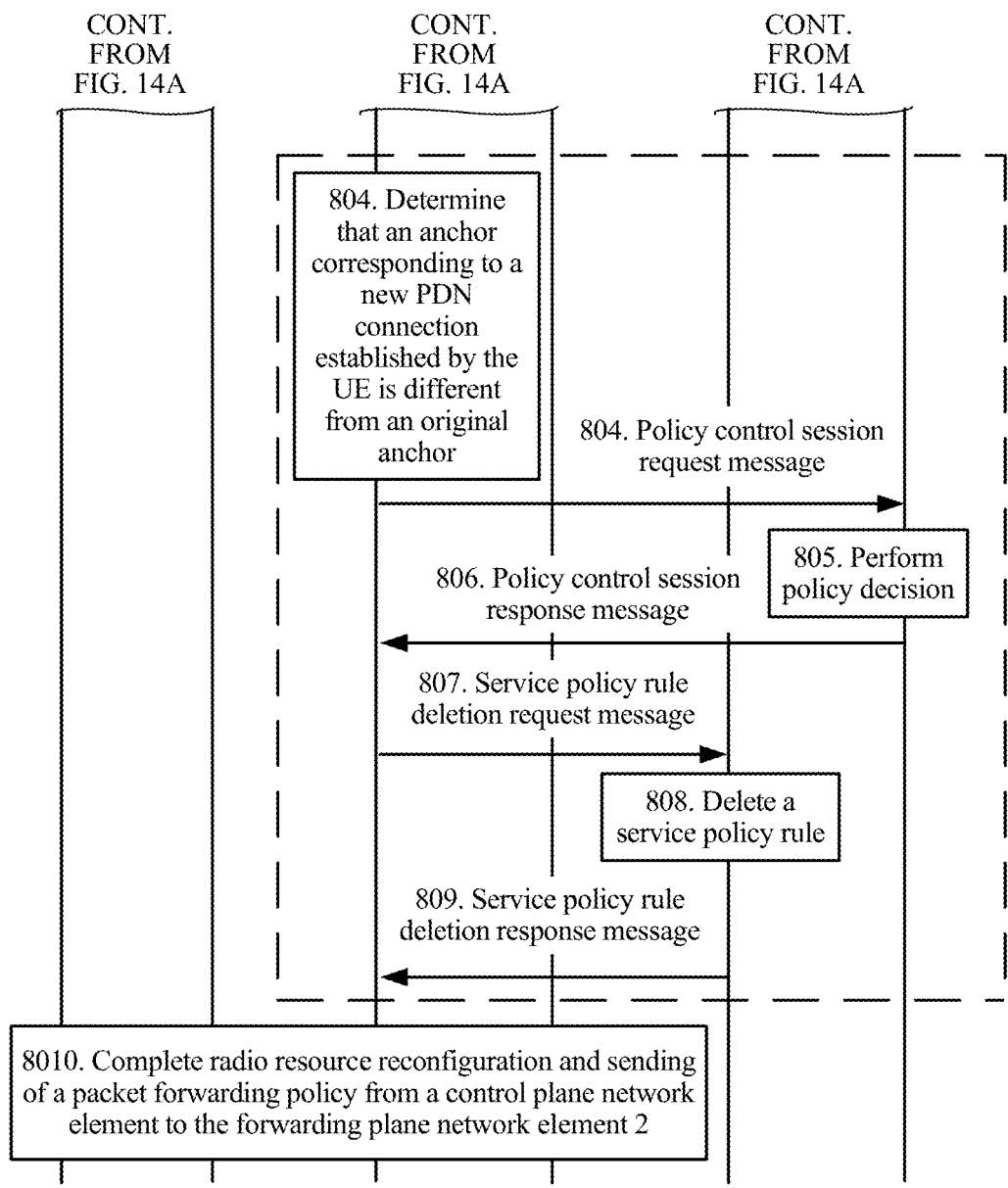

A specific process of this embodiment is shown in FIG. 14A and FIG. 14B. Referring to FIG. 14A and FIG. 14B, a policy control method includes the following steps.

Step 801. The UE initiates a new PDN connection establishment process.

The UE may determine, based on a correspondence that is between a PDN connection and location area information and is stored by the UE, to initiate new PDN connection establishment, that is, when a current location of the UE is not included in any location area indicated by the correspondence, a new PDN connection establishment condition is met. The location area information may be a cell list, a tracking area list, a location area identifier, a base station identifier group, a physical location range, or the like.

Step 802. The UE sends a PDN connection establishment request message to the control plane network element by using a base station.

The PDN connection establishment request message carries current location information of the UE.

Step 803. The control plane network element determines that the forwarding plane network element 2 serves the UE.

The control plane network element may determine a forwarding plane network element based on the current location information of the UE or a BS ID, and a service range of the forwarding plane network element.

Step 804. If determining that the anchor corresponding to the new PDN connection established by the UE is different from the original anchor, the control plane network element initiates a service policy rule obtaining process, and sends a policy control session request message to the policy decision network element.

The policy control session request message carries a connection identifier of the PDN connection 3 and a connection identifier of the PDN connection 2. Optionally, the message further carries an identifier of the anchor corresponding to the new PDN connection, namely, an identifier of the forwarding plane network element 2, to notify the policy decision network element that a policy enforcement point of a PDN connection is located at the forwarding plane network element 2.

Steps 805 and 806. The policy decision network element determines a service policy rule corresponding to the PDN connection 3 and a service policy rule corresponding to the PDN connection 2, and sends a policy control session response message to the control plane network element, where the message carries the service policy rule corresponding to the PDN connection 3 and the service policy rule corresponding to the PDN connection 2.

The service policy rule corresponding to the PDN connection 2 is used to instruct the forwarding plane network element 2 to perform policy control on a packet on the PDN connection 2. The service policy rule corresponding to the PDN connection 3 is used to instruct the forwarding plane network element 2 to perform policy control on a packet corresponding to the PDN connection 3. The service policy rule corresponding to the PDN connection 2 includes an indication identifier or tunnel information. The indication identifier or the tunnel information is used to instruct the forwarding plane network element 2 to perform, based on an IP 5-tuple in a tunnel, flow detection on a downlink packet from the forwarding plane network element 1.

Step 807. The control plane network element sends a service policy rule deletion request message to the forwarding plane network element 1.

The policy rule deletion request message is used to delete a service policy rule that is related to the PDN connection 2 and is on the forwarding plane network element 1, and carries a service policy rule identifier. The service policy rule identifier is used to indicate a service policy rule that needs to be deleted, and may be an identifier of a PDN connection. In this embodiment, the service policy rule identifier is the connection identifier of the PDN connection 2.

Steps 808 and 809. The forwarding plane network element 1 deletes a service policy rule corresponding to the PDN connection 2, and sends a service policy rule deletion response message to the control plane network element.

The service policy rule deletion request/response message in steps 807 and 809 may be in a form of a message during establishment of a plurality of PDN connections in an existing EPC network, for example, a bearer modification request/response message.

Step 8010. Complete radio resource reconfiguration between the UE and the BS and delivery of a packet forwarding policy from the control plane network element to the forwarding plane network element 2.

The packet forwarding policy carries the service policy rule in step 806.

Step 8010 may be any step performed after step 806. A specific execution sequence is not limited in the present disclosure.

It should be noted that, when a service policy rule corresponding to each PDN connection is determined by using a policy control session corresponding to each PDN connection, steps 804 to 809 may be replaced with the following processing process:

The control plane network element initiates a service policy rule obtaining process and a policy control session establishment process to the policy decision network element.

The service policy rule obtaining process means that the control plane network element obtains, from the policy decision network element, a policy control session corresponding to the PDN connection 2. The policy control session establishment process means establishing a policy control session that is between the control plane network element and the policy decision network element and that is corresponding to the new PDN connection 3, so that a service policy rule corresponding to the PDN connection 3 is determined by using the policy control session.

In the service policy rule obtaining process, the control plane network element sends a policy control session request to the policy decision network element, where the request carries an identifier of the PDN connection 2 and an identifier of the forwarding plane network element 2. The policy decision network element re-determines a corresponding service policy rule for the PDN connection 2, and sends a policy control session response message to the control plane network element, where the message carries the service policy rule corresponding to the PDN connection 2. The service policy rule corresponding to the PDN connection 2 includes an indication identifier or tunnel information. The indication identifier or the tunnel information is used to instruct the forwarding plane network element 2 to perform, based on an IP 5-tuple in a tunnel, flow detection on a downlink packet from the forwarding plane network element 1.

In the policy control session establishment process, the control plane network element sends a policy control session establishment request to the policy decision network element, where the request carries an identifier of the PDN connection 3 and the identifier of forwarding plane network element 2. The policy decision network element determines a corresponding service policy rule for the newly-established PDN connection 3, and sends, to the control plane network element, the service policy rule corresponding to the PDN connection 3.

A scenario described in this embodiment is as follows: When the UE initiates new PDN connection establishment, if the control plane network element determines that the anchor corresponding to the newly-established PDN connection is different from the original anchor, the control plane network element executes a policy enforcement point migration process, so that the policy enforcement point is located at the anchor corresponding to the newly-established PDN connection.

An improvement that differs the solution in Embodiment 8 of the present disclosure from the prior art is as follows: In the new PDN connection establishment process of the UE, the policy enforcement point migration process is executed, so that the policy enforcement point is located at the anchor corresponding to the newly-established PDN connection.

The foregoing embodiments of the present disclosure are described by using only two PDN connections as an example. One of the PDN connections is the original PDN connection, and the other PDN connection is the newly-established PDN connection. When more than two PDN connections exist, a processing process is similar. For example, there are originally 10 PDN connections, all the 10 PDN connections are original PDN connections, a new PDN connection is established, and the PDN connection is a newly-established PDN connection. For a case in which a plurality of original PDN connections exist, bearer migration processes and Gx session migration processes of the plurality of PDN connections may be combined for processing. Details are not described herein.

Figure 15:
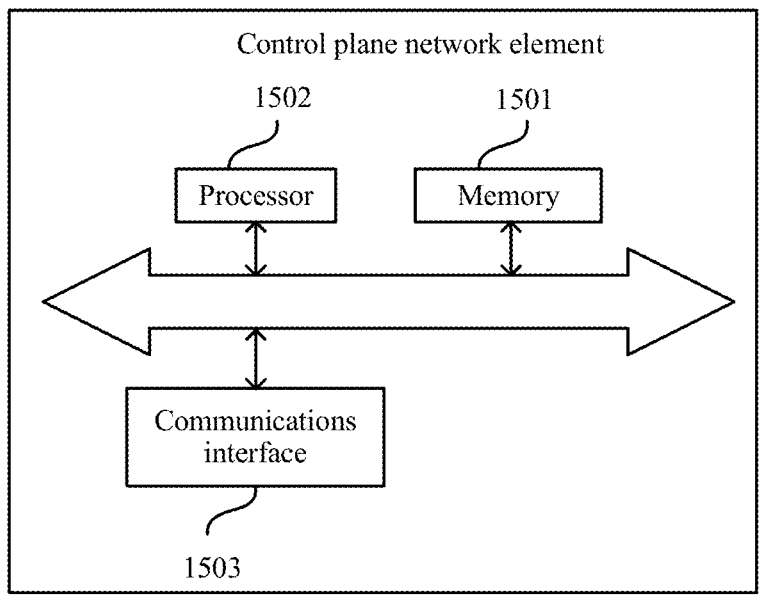
FIG. 15 is a structural diagram of a control plane network element according to an embodiment of the present disclosure.

FIG. 15 is a structural diagram of a control plane network element according to an embodiment of the present disclosure. The control plane network element is configured to implement a function of the control plane network element in the policy control method provided in the embodiments of the present disclosure. The control plane network element establishes, for UE, a first DN connection that uses a first forwarding plane network element as an anchor. The control plane network element includes:

a memory 1501, a processor 1502, and a communications interface 1503.

The memory 1501 is configured to store a program instruction.

The processor 1502 is configured to perform the following operation based on the program instruction stored in the memory 1501:

when receiving a handover notification message for the UE by using the communications interface 1503 and determining that a second forwarding plane network element serves the UE, or when establishing, for the UE, a second DN connection that uses a second forwarding plane network element as an anchor, updating a forwarding path of the first DN connection, so that an updated forwarding path of the first DN connection passes through the second forwarding plane network element, and the second forwarding plane network element performs policy control on a packet on the first DN connection.

In an example, after the processor 1502 performs the operation of updating a forwarding path of the first DN connection, so that an updated forwarding path of the first DN connection passes through the second forwarding plane network element, the processor 1502 is further configured to perform the following operations based on the program instruction stored in the memory 1501:

sending a session establishment request message or a redirection response message to the second forwarding plane network element by using the communications interface 1503, where the session establishment request message or the redirection response message is used to notify the second forwarding plane network element to: obtain, from a policy decision network element, a first service policy rule corresponding to the first DN connection existed after the forwarding path is updated, and perform, according to the first service policy rule, policy control on the packet on the first DN connection existed after the forwarding path is updated; or obtaining, from the policy decision network element by using the communications interface 1503, a first service policy rule corresponding to the first DN connection existed after the forwarding path is updated, and sending the first service policy rule to the second forwarding plane network element by using the communications interface 1503, where the first service policy rule is used to perform policy control on the packet on the first DN connection existed after the forwarding path is updated.

In an example, that the processor 1502 performs the operation of establishing, for the UE, a second DN connection that uses a second forwarding plane network element as an anchor includes:

sending a session establishment request message or a redirection response message to the second forwarding plane network element by using the communications interface 1503, where the session establishment request message or the redirection response message is used to notify the second forwarding plane network element to: obtain, from the policy decision network element, a second service policy rule corresponding to the second DN connection, and perform policy control on a packet on the second DN connection according to the second service policy rule; or obtaining, from the policy decision network element by using the communications interface 1503, a second service policy rule corresponding to the second DN connection, and sending the second service policy rule to the second forwarding plane network element by using the communications interface 1503, where the second service policy rule is used to perform policy control on a packet on the second DN connection.

In an example, that the processor 1502 performs the operation of obtaining, from the policy decision network element by using the communications interface 1503, a first service policy rule corresponding to the first DN connection existed after the forwarding path is updated and a second service policy rule corresponding to the second DN connection includes:

establishing one policy control session between the control plane network element and the policy decision network element, to obtain, from the policy decision network element by using the policy control session and the communications interface 1503, the first service policy rule corresponding to the first DN connection existed after the forwarding path is updated and the second service policy rule corresponding to the second DN connection; or establishing two policy control sessions between the control plane network element and the policy decision network element, to obtain, from the policy decision network element by using one of the two policy control sessions and the communications interface 1503, the first service policy rule corresponding to the first DN connection existed after the forwarding path is updated, and obtain, by using the other of the two policy control sessions and the communications interface 1503, the second service policy rule corresponding to the second DN connection.

In an example, that the processor 1502 performs the operation of establishing one policy control session between the control plane network element and the policy decision network element, to obtain, from the policy decision network element by using the policy control session and the communications interface 1503, the first service policy rule corresponding to the first DN connection existed after the forwarding path is updated and the second service policy rule corresponding to the second DN connection includes:

sending a first policy control session establishment request message to the policy decision network element by using the communications interface 1503, where the first policy control session establishment request message carries a connection identifier of the first DN connection and a connection identifier of the second DN connection; and receiving, by using the communications interface 1503, the first service policy rule corresponding to the first DN connection existed after the forwarding path is updated and the second service policy rule corresponding to the second DN connection, where the first service policy rule and the second service policy rule are sent by the policy decision network element based on the first policy control session establishment request message; or sending a second policy control session establishment request message to the policy decision network element by using the communications interface 1503, where the second policy control session establishment request message carries a connection identifier of the second DN connection; receiving, by using the communications interface 1503, the second service policy rule that is corresponding to the second DN connection and that is sent by the policy decision network element based on the second policy control session establishment request message; sending a policy control session request message to the policy decision network element by using the communications interface 1503, where the policy control session request message carries a connection identifier of the first DN connection; and receiving, by using the communications interface 1503, the first service policy rule that is corresponding to the first DN connection existed after the forwarding path is updated and that is sent by the policy decision network element based on the policy control session request message.

That the processor 1502 performs the operation of establishing two policy control sessions between the control plane network element and the policy decision network element, to obtain, from the policy decision network element by using one of the two policy control sessions and the communications interface 1503, the first service policy rule corresponding to the first DN connection existed after the forwarding path is updated, and obtain, by using the other of the two policy control sessions and the communications interface 1503, the second service policy rule corresponding to the second DN connection includes:

sending a third policy control session establishment request message to the policy decision network element by using the communications interface 1503, where the third policy control session establishment request message carries a connection identifier of the first DN connection; receiving, by using the communications interface 1503, the first service policy rule that is corresponding to the first DN connection existed after the forwarding path is updated and that is sent by the policy decision network element based on the third policy control session establishment request message; sending a fourth policy control session establishment request message to the policy decision network element by using the communications interface 1503, where the fourth policy control session establishment request message carries a connection identifier of the second DN connection; and receiving, by using the communications interface 1503, the second service policy rule that is corresponding to the second DN connection and that is sent by the policy decision network element based on the fourth policy control session establishment request message.

In an example, the first service policy rule includes an indication identifier or tunnel information, where the indication identifier or the tunnel information is used to notify the second forwarding plane network element to perform, based on an IP 5-tuple in a tunnel, flow detection on a downlink packet received from the first forwarding plane network element.

In an example, that the processor 1502 performs the operation of updating a forwarding path of the first DN connection, so that an updated forwarding path of the first DN connection passes through the second forwarding plane network element includes:

sending a session establishment request message to the second forwarding plane network element by using the communications interface 1503, where the session establishment request message is used to: notify the second forwarding plane network element to establish a packet forwarding path that is between the second forwarding plane network element and the first forwarding plane network element and that is corresponding to the first DN connection, and notify the second forwarding plane network element to establish, by using the control plane network element, a packet forwarding path that is between the second forwarding plane network element and a base station serving the UE and that is corresponding to the first DN connection; or by using the communications interface 1503, sending a first packet forwarding policy to the first forwarding plane network element, sending a second packet forwarding policy to the second forwarding plane network element, and sending a third packet forwarding policy to a base station serving the UE, where the first packet forwarding policy, the second packet forwarding policy, and the third packet forwarding policy are used to establish a packet forwarding path that is between the first forwarding plane network element and the second forwarding plane network element and that is corresponding to the first DN connection, and a packet forwarding path that is between the second forwarding plane network element and the base station and that is corresponding to the first DN connection.

In an example, after the processor 1502 performs the operation of obtaining, from the policy decision network element by using the communications interface 1503, a first service policy rule corresponding to the first DN connection existed after the forwarding path is updated, the processor is further configured to perform the following operations based on the program instruction stored in the memory:

receiving, by using the communications interface 1503, a policy control session deletion request message sent by the policy decision network element, where the policy control session deletion request message is used to delete a policy control session between the control plane network element and the policy decision network element; and sending a service policy rule deletion request message to the first forwarding plane network element based on the received policy control session deletion request message and by using the communications interface 1503, where the service policy rule deletion request message is used to notify the first forwarding plane network element to delete a third service policy rule corresponding to the first DN connection.

Figure 16:
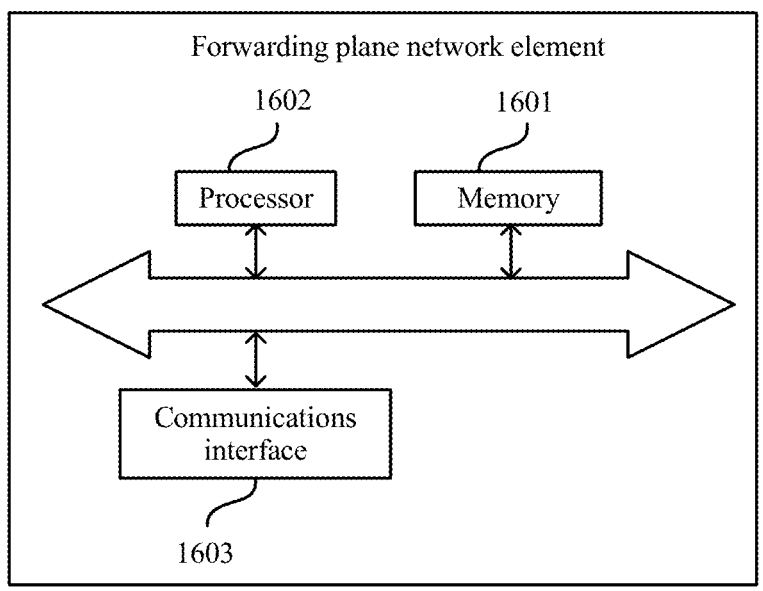
FIG. 16 is a structural diagram of a forwarding plane network element according to an embodiment of the present disclosure.

FIG. 16 is a structural diagram of a forwarding plane network element according to an embodiment of the present disclosure. The forwarding plane network element is a second forwarding plane network element. UE has a first DN connection that uses a first forwarding plane network element as an anchor. The second forwarding plane network element includes a memory 1601 and a processor 1602.

The memory 1601 is configured to store a program instruction.

The processor 1602 is configured to perform the following operations based on the program instruction stored in the memory 1601:

updating a forwarding path of the first DN connection, so that an updated forwarding path of the first DN connection passes through the second forwarding plane network element; and performing policy control on a packet on the first DN connection existed after the forwarding path is updated.

In an example, the second forwarding plane network element further includes a communications interface 1603.

That the processor 1602 performs the operation of performing policy control on a packet on the first DN connection existed after the forwarding path is updated includes:

receiving, by using the communications interface 1603, a session establishment request message or a redirection response message that is sent by a control plane network element; obtaining, from a policy decision network element based on the session establishment request message or the redirection response message, a first service policy rule corresponding to the first DN connection existed after the forwarding path is updated; and performing, according to the first service policy rule, policy control on the packet on the first DN connection existed after the forwarding path is updated; or receiving, by using the communications interface 1603, the first service policy rule that is sent by the control plane network element and that is corresponding to the first DN connection existed after the forwarding path is updated, and performing, according to the first service policy rule, policy control on the packet on the first DN connection existed after the forwarding path is updated.

In an example, the UE further has a second DN connection that uses the second forwarding plane network element as an anchor. The processor 1602 is further configured to perform the following operations based on the program instruction stored in the memory 1601:

receiving, by using the communications interface 1603, a session establishment request message or a redirection response message that is sent by the control plane network element; obtaining, from the policy decision network element based on the session establishment request message or the redirection response message and by using the communications interface 1603, a second service policy rule corresponding to the second DN connection; and performing policy control on a packet on the second DN connection according to the second service policy rule; or receiving, by using the communications interface 1603, a second service policy rule that is sent by the control plane network element and that is corresponding to the second DN connection, and performing policy control on a packet on the second DN connection according to the second service policy rule.

In an example, that the processor 1602 performs the operation of obtaining, from the policy decision network element by using the communications interface 1603, a first service policy rule corresponding to the first DN connection existed after the forwarding path is updated and a second service policy rule corresponding to the second DN connection includes:

establishing one policy control session between the second forwarding plane network element and the policy decision network element, to obtain, from the policy decision network element by using the policy control session and the communications interface 1603, the first service policy rule corresponding to the first DN connection existed after the forwarding path is updated and the second service policy rule corresponding to the second DN connection; or establishing two policy control sessions between the second forwarding plane network element and the policy decision network element, to obtain, from the policy decision network element by using one of the two policy control sessions and the communications interface 1603, the first service policy rule corresponding to the first DN connection existed after the forwarding path is updated, and obtain, by using the other of the two policy control sessions and the communications interface 1603, the second service policy rule corresponding to the second DN connection.

In an example, that the processor 1602 performs the operation of establishing one policy control session between the second forwarding plane network element and the policy decision network element, to obtain, from the policy decision network element by using the policy control session and the communications interface 1603, the first service policy rule corresponding to the first DN connection existed after the forwarding path is updated and the second service policy rule corresponding to the second DN connection includes:

sending a first policy control session establishment request message to the policy decision network element by using the communications interface 1603, where the first policy control session establishment request message carries a connection identifier of the first DN connection and a connection identifier of the second DN connection; and receiving, by using the communications interface 1603, the first service policy rule corresponding to the first DN connection existed after the forwarding path is updated and the second service policy rule corresponding to the second DN connection, where the first service policy rule and the second service policy rule are sent by the policy decision network element based on the first policy control session establishment request message; or sending a second policy control session establishment request message to the policy decision network element by using the communications interface 1603, where the second policy control session establishment request message carries a connection identifier of the second DN connection; receiving, by using the communications interface 1603, the second service policy rule that is corresponding to the second DN connection and that is sent by the policy decision network element based on the second policy control session establishment request message; sending a policy control session request message to the policy decision network element by using the communications interface 1603, where the policy control session request message carries a connection identifier of the first DN connection; and receiving, by using the communications interface 1603, the first service policy rule that is corresponding to the first DN connection existed after the forwarding path is updated and that is sent by the policy decision network element based on the policy control session request message.

That the processor 1602 performs the operation of establishing two policy control sessions between the second forwarding plane network element and the policy decision network element, to obtain, from the policy decision network element by using one of the two policy control sessions and the communications interface 1603, the first service policy rule corresponding to the first DN connection existed after the forwarding path is updated, and obtain, by using the other of the two policy control sessions and the communications interface 1603, the second service policy rule corresponding to the second DN connection includes:

sending a third policy control session establishment request message to the policy decision network element by using the communications interface 1603, where the third policy control session establishment request message carries a connection identifier of the first DN connection; receiving, by using the communications interface 1603, the first service policy rule that is corresponding to the first DN connection existed after the forwarding path is updated and that is sent by the policy decision network element based on the third policy control session establishment request message; sending a fourth policy control session establishment request message to the policy decision network element by using the communications interface 1603, where the fourth policy control session establishment request message carries a connection identifier of the second DN connection; and receiving, by using the communications interface 1603, the second service policy rule that is corresponding to the second DN connection and that is sent by the policy decision network element based on the fourth policy control session establishment request message.

In an example, that the processor 1602 performs the operation of updating a forwarding path of the first DN connection includes:

receiving, by using the communications interface 1603, a session establishment request message sent by the control plane network element; establishing, based on the session establishment request message, a packet forwarding path that is between the second forwarding plane network element and the first forwarding plane network element and that is corresponding to the first DN connection; and establishing, based on the session establishment request message and by using the control plane network element, a packet forwarding path that is between the second forwarding plane network element and a base station serving the UE and that is corresponding to the first DN connection; or receiving, by using the communications interface 1603, a second packet forwarding policy sent by the control plane network element, so that the second forwarding plane network element and the first forwarding plane network element establish, respectively based on the second packet forwarding policy and a first packet forwarding policy received from the control plane network element, a packet forwarding path that is between the first forwarding plane network element and the second forwarding plane network element and that is corresponding to the first DN connection; and the second forwarding plane network element and a base station serving the UE establish, respectively based on the second packet forwarding policy and a third packet forwarding policy received from the control plane network element, a packet forwarding path that is between the second forwarding plane network element and the base station and that is corresponding to the first DN connection.

Figure 17:
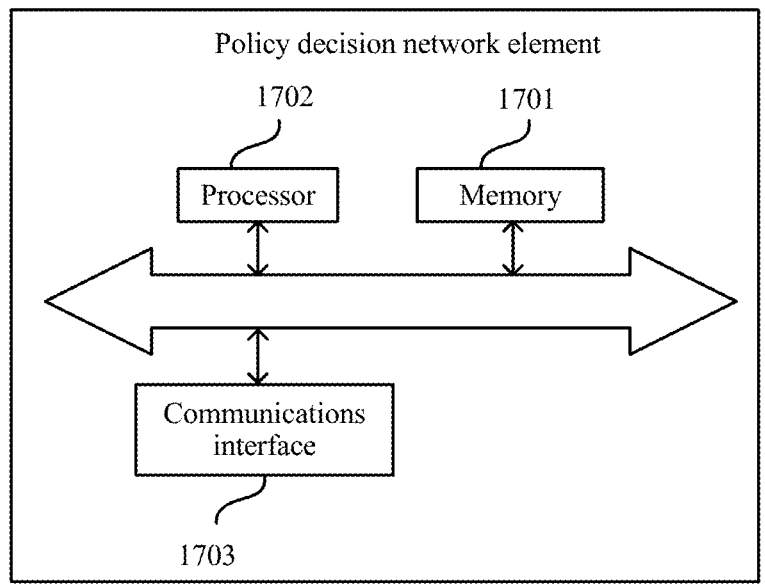
FIG. 17 is a structural diagram of a policy decision network element according to an embodiment of the present disclosure.

FIG. 17 is a structural diagram of a policy decision network element according to an embodiment of the present disclosure. UE has a first DN connection that uses a first forwarding plane network element as an anchor. The policy decision network element includes a memory 1701, a processor 1702, and a communications interface 1703.

The memory 1701 is configured to store a program instruction.

The processor 1702 is configured to perform the following operations based on the program instruction stored in the memory 1701:

receiving, by using the communications interface 1703, a first policy control session establishment request message sent by a control plane network element or a second forwarding plane network element, where the first policy control session establishment request message carries a connection identifier of the first DN connection; and sending, to the second forwarding plane network element or the control plane network element based on the first policy control session establishment request message and by using the communications interface 1703, a first service policy rule corresponding to the first DN connection, where the first service policy rule is used to perform policy control on a packet on the first DN connection.

In an example, the processor 1702 is further configured to perform the following operations based on the program instruction stored in the memory 1701:

when the first policy control session establishment request message further carries a connection identifier of a second DN connection, and the second DN connection uses the second forwarding plane network element as an anchor, sending, to the second forwarding plane network element or the control plane network element based on the first policy control session establishment request message and by using the communications interface 1703, a second service policy rule corresponding to the second DN connection, where the second service policy rule is used to perform policy control on a packet on the second DN connection; or receiving, by using the communications interface 1703, a policy control session request message sent by the second forwarding plane network element or the control plane network element, where the policy control session request message carries an identifier of the second DN connection; and sending, to the second forwarding plane network element or the control plane network element based on the policy control session request message and by using the communications interface 1703, a second service policy rule corresponding to the second DN connection, where the second service policy rule is used to perform policy control on a packet on the second DN connection; or receiving, by using the communications interface 1703, a second policy control session establishment request message sent by the second forwarding plane network element or the control plane network element, where the second policy control session establishment request message carries a connection identifier of the second DN connection; and sending, to the second forwarding plane network element or the control plane network element based on the second policy control session establishment request message and by using the communications interface 1703, a second service policy rule corresponding to the second DN connection, where the second service policy rule is used to perform policy control on a packet on the second DN connection.

In an example, after the processor 1702 performs the operation of sending, to the second forwarding plane network element or the control plane network element based on the first policy control session establishment request message and by using the communications interface 1703, a first service policy rule corresponding to the first DN connection, the processor 1702 is further configured to perform the following operation based on the program instruction stored in the memory 1701:

sending a policy control session deletion request message to the first forwarding plane network element or the control plane network element by using the communications interface 1703, where the policy control session deletion request message is used to: delete a policy control session between the first forwarding plane network element and the policy decision network element, or delete a policy control session between the control plane network element and the policy decision network element.

Figure 18:
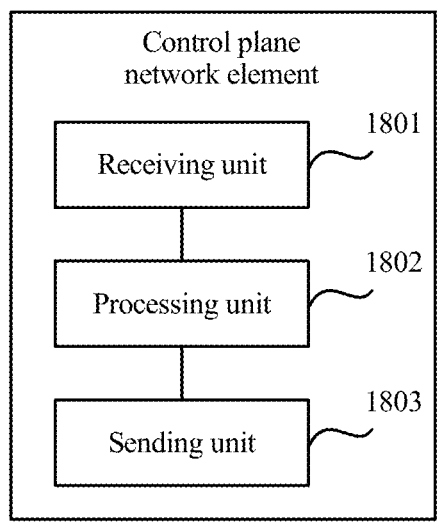
FIG. 18 is a structural diagram of another control plane network element according to an embodiment of the present disclosure.

FIG. 18 is a structural diagram of another control plane network element according to an embodiment of the present disclosure. The control plane network element is configured to implement a function of the control plane network element in the policy control method provided in the embodiments of the present disclosure. The control plane network element establishes, for UE, a first DN connection that uses a first forwarding plane network element as an anchor. The control plane network element includes a receiving unit 1801 and a processing unit 1802.

The receiving unit 1801 is configured to receive a message or an instruction that is sent by another network element.

The receiving unit 1801 may specifically receive the message or the instruction by using the foregoing communications interface 1503.

The processing unit 1802 is configured to: when the receiving unit 1801 receives a handover notification message for the UE and the processing unit 1802 determines that a second forwarding plane network element serves the UE, or when the processing unit 1802 establishes, for the UE, a second DN connection that uses a second forwarding plane network element as an anchor, update a forwarding path of the first DN connection, so that an updated forwarding path of the first DN connection passes through the second forwarding plane network element, and the second forwarding plane network element performs policy control on a packet on the first DN connection.

The processing unit 1802 may be specifically the foregoing processor 1502.

In an example, the control plane network element further includes a sending unit 1803.

The sending unit 1803 is configured to send a message or an instruction to another network element.

The sending unit 1803 may specifically send the message or the instruction by using the foregoing communications interface 1503.

After updating the forwarding path of the first DN connection, so that the updated forwarding path of the first DN connection passes through the second forwarding plane network element, the processing unit is 1802 further configured to:

instruct the sending unit 1803 to send a session establishment request message or a redirection response message to the second forwarding plane network element, where the session establishment request message or the redirection response message is used to notify the second forwarding plane network element to: obtain, from a policy decision network element, a first service policy rule corresponding to the first DN connection existed after the forwarding path is updated, and perform, according to the first service policy rule, policy control on the packet on the first DN connection existed after the forwarding path is updated; or instruct the receiving unit 1801 to obtain, from the policy decision network element, a first service policy rule corresponding to the first DN connection existed after the forwarding path is updated, and instruct the sending unit 1803 to send the first service policy rule to the second forwarding plane network element, where the first service policy rule is used to perform policy control on the packet on the first DN connection existed after the forwarding path is updated.

In an example, the processing unit 1802 is specifically configured to:

instruct the sending unit 1803 to send a session establishment request message or a redirection response message to the second forwarding plane network element, where the session establishment request message or the redirection response message is used to notify the second forwarding plane network element to: obtain, from the policy decision network element, a second service policy rule corresponding to the second DN connection, and perform policy control on a packet on the second DN connection according to the second service policy rule; or instruct the receiving unit 1801 to obtain, from the policy decision network element, a second service policy rule corresponding to the second DN connection, and instruct the sending unit 1803 to send the second service policy rule to the second forwarding plane network element, where the second service policy rule is used to perform policy control on a packet on the second DN connection.

In an example, the processing unit 1802 is specifically configured to:

establish one policy control session between the control plane network element and the policy decision network element, to obtain, from the policy decision network element by using the policy control session, the first service policy rule corresponding to the first DN connection existed after the forwarding path is updated and the second service policy rule corresponding to the second DN connection; or establish two policy control sessions between the control plane network element and the policy decision network element, to obtain, from the policy decision network element by using one of the two policy control sessions, the first service policy rule corresponding to the first DN connection existed after the forwarding path is updated, and obtain, by using the other of the two policy control sessions, the second service policy rule corresponding to the second DN connection.

In an example, the processing unit 1802 is specifically configured to:

instruct the sending unit 1803 to send a first policy control session establishment request message to the policy decision network element, where the first policy control session establishment request message carries a connection identifier of the first DN connection and a connection identifier of the second DN connection; and instruct the receiving unit 1801 to receive the first service policy rule corresponding to the first DN connection existed after the forwarding path is updated and the second service policy rule corresponding to the second DN connection, where the first service policy rule and the second service policy rule are sent by the policy decision network element based on the first policy control session establishment request message; or instruct the sending unit 1803 to send a second policy control session establishment request message to the policy decision network element, where the second policy control session establishment request message carries a connection identifier of the second DN connection; instruct the receiving unit 1801 to receive the second service policy rule that is corresponding to the second DN connection and that is sent by the policy decision network element based on the second policy control session establishment request message; instruct the sending unit 1803 to send a policy control session request message to the policy decision network element, where the policy control session request message carries a connection identifier of the first DN connection; and instruct the receiving unit 1801 to receive the first service policy rule that is corresponding to the first DN connection existed after the forwarding path is updated and that is sent by the policy decision network element based on the policy control session request message.

The establishing two policy control sessions between the control plane network element and the policy decision network element, to obtain, from the policy decision network element by using one of the two policy control sessions, the first service policy rule corresponding to the first DN connection existed after the forwarding path is updated, and obtain, by using the other of the two policy control sessions, the second service policy rule corresponding to the second DN connection includes:

instructing the sending unit 1803 to send a third policy control session establishment request message to the policy decision network element, where the third policy control session establishment request message carries a connection identifier of the first DN connection; instructing the receiving unit 1801 to receive the first service policy rule that is corresponding to the first DN connection existed after the forwarding path is updated and that is sent by the policy decision network element based on the third policy control session establishment request message; instructing the sending unit 1803 to send a fourth policy control session establishment request message to the policy decision network element, where the fourth policy control session establishment request message carries a connection identifier of the second DN connection; and instructing the receiving unit 1801 to receive the second service policy rule that is corresponding to the second DN connection and that is sent by the policy decision network element based on the fourth policy control session establishment request message.

In an example, the first service policy rule includes an indication identifier or tunnel information, where the indication identifier or the tunnel information is used to notify the second forwarding plane network element to perform, based on an IP 5-tuple in a tunnel, flow detection on a downlink packet received from the first forwarding plane network element.

In an example, the processing unit 1802 is specifically configured to:

instruct the sending unit 1803 to send a session establishment request message to the second forwarding plane network element, where the session establishment request message is used to: notify the second forwarding plane network element to establish a packet forwarding path that is between the second forwarding plane network element and the first forwarding plane network element and that is corresponding to the first DN connection, and notify the second forwarding plane network element to establish, by using the control plane network element, a packet forwarding path that is between the second forwarding plane network element and a base station serving the UE and that is corresponding to the first DN connection; or instruct the sending unit 1803 to: send a first packet forwarding policy to the first forwarding plane network element, send a second packet forwarding policy to the second forwarding plane network element, and send a third packet forwarding policy to a base station serving the UE, where the first packet forwarding policy, the second packet forwarding policy, and the third packet forwarding policy are used to establish a packet forwarding path that is between the first forwarding plane network element and the second forwarding plane network element and that is corresponding to the first DN connection, and a packet forwarding path that is between the second forwarding plane network element and the base station and that is corresponding to the first DN connection.

In an example, after the first service policy rule corresponding to the first DN connection existed after the forwarding path is updated is obtained from the policy decision network element, the processing unit 1802 is further configured to:

instruct the receiving unit 1801 to receive a policy control session deletion request message sent by the policy decision network element, where the policy control session deletion request message is used to delete a policy control session between the control plane network element and the policy decision network element; and instruct, based on the received policy control session deletion request message, the sending unit 1803 to send a service policy rule deletion request message to the first forwarding plane network element, where the service policy rule deletion request message is used to notify the first forwarding plane network element to delete a third service policy rule corresponding to the first DN connection.

Figure 19:
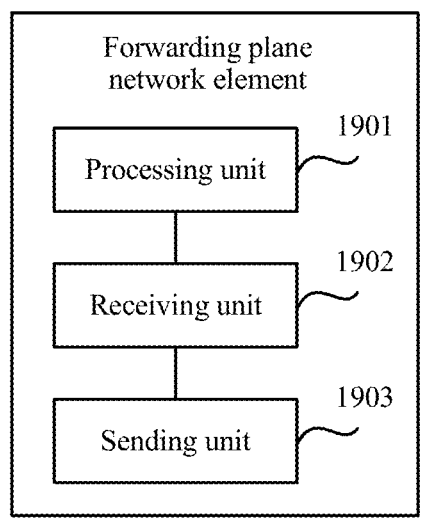
FIG. 19 is a structural diagram of another forwarding plane network element according to an embodiment of the present disclosure.

FIG. 19 is a structural diagram of another forwarding plane network element according to an embodiment of the present disclosure. The forwarding plane network element is configured to implement a function of the second forwarding plane network element in the policy control method provided in the embodiments of the present disclosure. UE has a first DN connection that uses a first forwarding plane network element as an anchor. The forwarding plane network element includes:

a processing unit 1901, configured to: update a forwarding path of the first DN connection, so that an updated forwarding path of the first DN connection passes through the second forwarding plane network element; and perform policy control on a packet on the first DN connection existed after the forwarding path is updated.

The processing unit 1901 may be specifically the foregoing processor 1602.

In an example, the forwarding plane network element further includes a receiving unit 1902.

The receiving unit 1902 is configured to receive a message or an instruction that is sent by another network element.

The receiving unit 1902 may specifically receive the message or the instruction by using the foregoing communications interface 1603.

The processing unit 1901 is specifically configured to:

instruct the receiving unit 1902 to receive a session establishment request message or a redirection response message that is sent by a control plane network element; obtain, from a policy decision network element based on the session establishment request message or the redirection response message, a first service policy rule corresponding to the first DN connection existed after the forwarding path is updated; and perform, according to the first service policy rule, policy control on the packet on the first DN connection existed after the forwarding path is updated; or instruct the receiving unit 1902 to receive the first service policy rule that is sent by the control plane network element and that is corresponding to the first DN connection existed after the forwarding path is updated, and perform, according to the first service policy rule, policy control on the packet on the first DN connection existed after the forwarding path is updated.

In an example, the UE further has a second DN connection that uses the second forwarding plane network element as an anchor. The processing unit 1901 is further configured to:

instruct the receiving unit 1902 to receive a session establishment request message or a redirection response message that is sent by the control plane network element; obtain, from the policy decision network element based on the session establishment request message or the redirection response message, a second service policy rule corresponding to the second DN connection; and perform policy control on a packet on the second DN connection according to the second service policy rule; or instruct the receiving unit 1902 to receive a second service policy rule that is sent by the control plane network element and that is corresponding to the second DN connection, and perform policy control on a packet on the second DN connection according to the second service policy rule.

In an example, the processing unit 1901 is specifically configured to:

establish one policy control session between the second forwarding plane network element and the policy decision network element, to obtain, from the policy decision network element by using the policy control session, the first service policy rule corresponding to the first DN connection existed after the forwarding path is updated and the second service policy rule corresponding to the second DN connection; or establish two policy control sessions between the second forwarding plane network element and the policy decision network element, to obtain, from the policy decision network element by using one of the two policy control sessions, the first service policy rule corresponding to the first DN connection existed after the forwarding path is updated, and obtain, by using the other of the two policy control sessions, the second service policy rule corresponding to the second DN connection.

In an example, the forwarding plane network element further includes a sending unit 1903.

The sending unit 1903 is configured to send a message or an instruction to another network element.

The sending unit 1903 may specifically send the message or the instruction by using the foregoing communications interface 1603.

The processing unit 1901 is specifically configured to:

instruct the sending unit 1903 to send a first policy control session establishment request message to the policy decision network element, where the first policy control session establishment request message carries a connection identifier of the first DN connection and a connection identifier of the second DN connection; and instruct the receiving unit 1902 to receive the first service policy rule corresponding to the first DN connection existed after the forwarding path is updated and the second service policy rule corresponding to the second DN connection, where the first service policy rule and the second service policy rule are sent by the policy decision network element based on the first policy control session establishment request message; or instruct the sending unit 1903 to send a second policy control session establishment request message to the policy decision network element, where the second policy control session establishment request message carries a connection identifier of the second DN connection; instruct the receiving unit 1902 to receive the second service policy rule that is corresponding to the second DN connection and that is sent by the policy decision network element based on the second policy control session establishment request message; instruct the sending unit 1903 to send a policy control session request message to the policy decision network element, where the policy control session request message carries a connection identifier of the first DN connection; and instruct the receiving unit 1902 to receive the first service policy rule that is corresponding to the first DN connection existed after the forwarding path is updated and that is sent by the policy decision network element based on the policy control session request message.

The processing unit 1901 is specifically configured to:

instruct the sending unit 1903 to send a third policy control session establishment request message to the policy decision network element, where the third policy control session establishment request message carries a connection identifier of the first DN connection; instruct the receiving unit 1902 to receive the first service policy rule that is corresponding to the first DN connection existed after the forwarding path is updated and that is sent by the policy decision network element based on the third policy control session establishment request message; instruct the sending unit 1903 to send a fourth policy control session establishment request message to the policy decision network element, where the fourth policy control session establishment request message carries a connection identifier of the second DN connection; and instruct the receiving unit 1902 to receive the second service policy rule that is corresponding to the second DN connection and that is sent by the policy decision network element based on the fourth policy control session establishment request message.

In an example, the processing unit 1901 is specifically configured to:

instruct the receiving unit 1902 to receive a session establishment request message sent by the control plane network element; establish, based on the session establishment request message, a packet forwarding path that is between the second forwarding plane network element and the first forwarding plane network element and that is corresponding to the first DN connection; and establish, based on the session establishment request message and by using the control plane network element, a packet forwarding path that is between the second forwarding plane network element and a base station serving the UE and that is corresponding to the first DN connection; or instruct the receiving unit 1902 to receive a second packet forwarding policy sent by the control plane network element, so that the second forwarding plane network element and the first forwarding plane network element establish, respectively based on the second packet forwarding policy and a first packet forwarding policy received from the control plane network element, a packet forwarding path that is between the first forwarding plane network element and the second forwarding plane network element and that is corresponding to the first DN connection; and the second forwarding plane network element and a base station serving the UE establish, respectively based on the second packet forwarding policy and a third packet forwarding policy received from the control plane network element, a packet forwarding path that is between the second forwarding plane network element and the base station and that is corresponding to the first DN connection.

Figure 20:
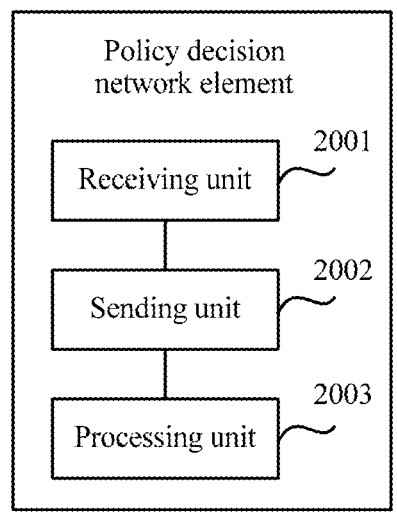
FIG. 20 is a structural diagram of another policy decision network element according to an embodiment of the present disclosure.

FIG. 20 is a structural diagram of another policy decision network element according to an embodiment of the present disclosure. The policy decision network element is configured to implement a function of the policy decision network element in the policy control method provided in the embodiments of the present disclosure. UE has a first DN connection that uses a first forwarding plane network element as an anchor. The policy decision network element includes a receiving unit 2001, a sending unit 2002, and a processing unit 2003.

The receiving unit 2001 is configured to receive a message or an instruction that is sent by another network element.

The receiving unit 2001 may specifically receive the message or the instruction by using the foregoing communications interface 1703.

The sending unit 2002 is configured to send a message or an instruction to another network element.

The sending unit 2003 may specifically send the message or the instruction by using the foregoing communications interface 1703.

The processing unit 2003 is configured to: instruct the receiving unit 2001 to receive a first policy control session establishment request message sent by a control plane network element or a second forwarding plane network element, where the first policy control session establishment request message carries a connection identifier of the first DN connection; and instruct, based on the first policy control session establishment request message, the sending unit 2002 to send, to the second forwarding plane network element or the control plane network element, a first service policy rule corresponding to the first DN connection, where the first service policy rule is used to perform policy control on a packet on the first DN connection.

In an example, the processing unit 2003 is further configured to:

when the first policy control session establishment request message further carries a connection identifier of a second DN connection, and the second DN connection uses the second forwarding plane network element as an anchor, instruct, based on the first policy control session establishment request message, the sending unit 2002 to send, to the second forwarding plane network element or the control plane network element, a second service policy rule corresponding to the second DN connection, where the second service policy rule is used to perform policy control on a packet on the second DN connection; or instruct the receiving unit 2001 to receive a policy control session request message sent by the second forwarding plane network element or the control plane network element, where the policy control session request message carries an identifier of the second DN connection; and instruct, based on the policy control session request message, the sending unit 2002 to send, to the second forwarding plane network element or the control plane network element, a second service policy rule corresponding to the second DN connection, where the second service policy rule is used to perform policy control on a packet on the second DN connection; or instruct the receiving unit 2001 to receive a second policy control session establishment request message sent by the second forwarding plane network element or the control plane network element, where the second policy control session establishment request message carries a connection identifier of the second DN connection; and instruct, based on the second policy control session establishment request message, the sending unit 2002 to send, to the second forwarding plane network element or the control plane network element, a second service policy rule corresponding to the second DN connection, where the second service policy rule is used to perform policy control on a packet on the second DN connection.

In an example, after the first service policy rule corresponding to the first DN connection is sent to the second forwarding plane network element or the control plane network element based on the first policy control session establishment request message, the processing unit 2003 is further configured to:

instruct the sending unit 2002 to send a policy control session deletion request message to the first forwarding plane network element or the control plane network element, where the policy control session deletion request message is used to: delete a policy control session between the first forwarding plane network element and the policy decision network element, or delete a policy control session between the control plane network element and the policy decision network element.

Figure 21:
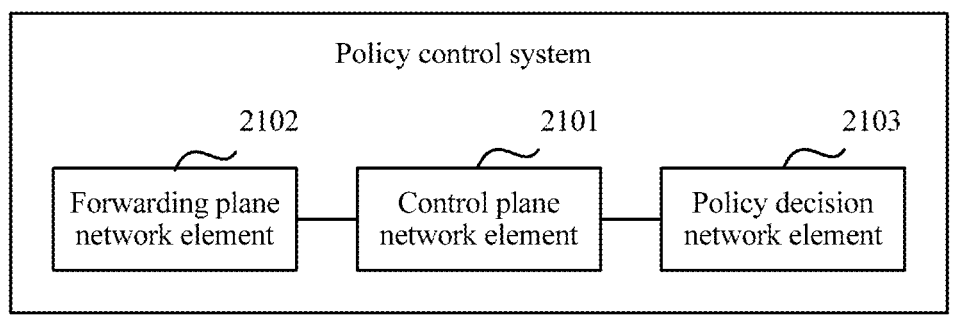
FIG. 21 is a structural diagram of a policy control system according to an embodiment of the present disclosure.

FIG. 21 is a structural diagram of a policy control system according to an embodiment of the present disclosure. The system includes a control plane network element 2101, a forwarding plane network element 2102, and a policy decision network element 2103. The control plane network element 2101, the forwarding plane network element 2102, and the policy decision network element 2103 are configured to implement the policy control method provided in the embodiments of the present disclosure.

The methods or algorithm steps described with reference to the content disclosed in the present disclosure may be implemented by hardware, or may be implemented by executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in the present disclosure may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium that can be accessed by a general-purpose or dedicated computer.

The objectives, technical solutions, and beneficial effects of the present disclosure are further described in detail in the foregoing specific implementations. It should be understood that the foregoing descriptions are only specific implementations of the present disclosure, but are not intended to limit the protection scope of the present disclosure. Any modification, equivalent replacement, or improvement made based on the technical solutions in the present disclosure shall fall within the protection scope of the present disclosure.

What is claimed is:

1. An apparatus comprising:
an interface;
one or more processors; and
a non-transitory computer-readable storage medium storing a program to be executed by the one or more processors, the program including instructions to:
establish a first data network connection using a first forwarding plane network element as an anchor for a user equipment;
select a second forwarding plane network element for the user equipment;
obtain, from a policy decision network element, a service policy rule associated with the first data network connection based on information associated with the second forwarding plane network element;
send the service policy rule to the second forwarding plane network element; and
update a path of the first data network connection, wherein the updated path of the first data network connection maintains a connection through the first forwarding plane network element, and passes through the second forwarding plane network element,
wherein the service policy rule is for policy control on a packet transmitted on the updated path of the first data network connection at the second forwarding plane network element.

2. The apparatus according to claim 1, wherein the program includes instructions to establish a session between the apparatus and the policy decision network element, to obtain, from the policy decision network element by using the session, the service policy rule associated with the first data network connection.

3. The apparatus according to claim 1, wherein the service policy rule comprises information for notifying the second forwarding plane network element to perform flow detection on a packet based on an Internet Protocol (IP) 5-tuple transmitted on a tunnel between the first forwarding plane network element and the second forwarding plane network element.

4. The apparatus according to claim 1, wherein the updated path of the first data network connection comprises a tunnel between the first forwarding plane network element and the second forwarding plane network element, and the service policy rule comprises tunnel information of the second forwarding plane network element for the tunnel.

5. The apparatus according to claim 1, wherein for updating the path of the first data network connection, the program includes instructions to:
send a message to the second forwarding plane network element, wherein the message notifies the second forwarding plane network element to establish a tunnel between the second forwarding plane network element and the first forwarding plane network element and that is associated with the first data network connection; and
notify the second forwarding plane network element to establish a path between the second forwarding plane network element and a base station serving the user equipment and that is associated with the first data network connection.

6. The apparatus according to claim 1, wherein for updating the path of the first data network connection, wherein the program includes instructions to:
send a first packet forwarding policy to the first forwarding plane network element;
send a second packet forwarding policy to the second forwarding plane network element; and
send a third packet forwarding policy to a base station serving the user equipment,
wherein the first packet forwarding policy, the second packet forwarding policy, and the third packet forwarding policy are for establishment of a tunnel between the second forwarding plane network element and the first forwarding plane network element and associated with the first data network connection, and for establishment of a path between the second forwarding plane network element and the base station serving the user equipment and associated with the first data network connection.

7. A communications method comprising:
establishing, by a control plane network element, a first data network connection using a first forwarding plane network element as an anchor for a user equipment;
selecting, by the control plane network element, a second forwarding plane network element for the user equipment;
obtaining, by the control plane network element, from a policy decision network element, a service policy rule associated with the first data network connection based on information associated with the second forwarding plane network element;

sending, by the control plane network element, the service policy rule to the second forwarding plane network element; and updating, by the control plane network element, a path of the first data network connection, wherein the updated path of the first data network connection maintains a connection through the first forwarding plane network element, and passes through the second forwarding plane network element, wherein the service policy rule is for policy control on a packet transmitted on the updated path of the first data network connection at the second forwarding plane network element.

8. The method according to claim 7, further comprising:
establishing, by the control plane network element, a session between the control plane network element and the policy decision network element, to obtain, from the policy decision network element by using the session, the service policy rule associated with the first data network connection.

9. The method according to claim 7, wherein the service policy rule comprises information for notifying the second forwarding plane network element to perform flow detection on a packet based on an Internet Protocol (IP) 5-tuple transmitted on a tunnel between the first forwarding plane network element and the second forwarding plane network element.

10. The method according to claim 7, wherein the updated path of the first data network connection comprises a tunnel between the first forwarding plane network element and the second forwarding plane network element, and the service policy rule comprises tunnel information of the second forwarding plane network element for the tunnel.

11. The method according to claim 7, wherein updating the path of the first data network connection comprises:
sending, by the control plane network element, a message to the second forwarding plane network element, wherein the message notifies the second forwarding plane network element to establish a tunnel between the second forwarding plane network element and the first forwarding plane network element and that is associated with the first data network connection, and notifying the second forwarding plane network element to establish a path between the second forwarding plane network element and a base station serving the user equipment and that is associated with the first data network connection.

12. The method according to claim 7, wherein updating the path of the first data network connection comprises:
sending, by the control plane network element, a first packet forwarding policy to the first forwarding plane network element;
sending, by the control plane network element, a second packet forwarding policy to the second forwarding plane network element; and
sending, by the control plane network element, a third packet forwarding policy to a base station serving the user equipment,
wherein the first packet forwarding policy, the second packet forwarding policy, and the third packet forwarding policy are for establishment of a tunnel between the second forwarding plane network element and the first forwarding plane network element and that is associated with the first data network connection, and for establishment of a path between the second forwarding plane network element and the base station serving the user equipment and that is associated with the first data network connection.

13. A communications method, applied to a system including a control plane network element, a policy decision network element, and a second forwarding plane network element, the method comprising:
establishing, by the control plane network element, a first data network connection using a first forwarding plane network element as an anchor for a user equipment;
selecting, by the control plane network element, the second forwarding plane network element for the user equipment;
sending, by the control plane network element, a message to the policy decision network element based on information associated with the second forwarding plane network element;
sending, by the policy decision network element to the control plane network element, a service policy rule associated with the first data network connection in response to the message;
sending, by the control plane network element, the service policy rule to the second forwarding plane network element;
updating, by the control plane network element, a path of the first data network connection, wherein the updated path of the first data network connection maintains a connection through the first forwarding plane network element, and passes through the second forwarding plane network element;
receiving, by the second forwarding plane network element, the service policy rule; and
performing, by the second forwarding plane network element according to the service policy rule, policy control on a packet transmitted on the updated path of the first data network connection.

14. The method according to claim 13, further comprising:
establishing, by the control plane network element, a session between the control plane network element and the policy decision network element, to obtain, from the policy decision network element by using the session, the service policy rule associated with the first data network connection.

15. The method according to claim 13, wherein updating the path of the first data network connection comprises:
sending, by the control plane network element, a first packet forwarding policy to the first forwarding plane network element;
sending, by the control plane network element, a second packet forwarding policy to the second forwarding plane network element; and
sending, by the control plane network element, a third packet forwarding policy to a base station serving the user equipment,
wherein the first packet forwarding policy, the second packet forwarding policy, and the third packet forwarding policy are for establishment of a tunnel between the second forwarding plane network element and the first forwarding plane network element and that is associated with the first data network connection, and for establishment of a path between the second forwarding plane network element and the base station serving the user equipment and that is associated with the first data network connection.

16. A communications system comprising:
a control plane network element configured to:
  establish a first data network connection using a first forwarding plane network element as an anchor for a user equipment;
  select a second forwarding plane network element for the user equipment;
  obtain, from a policy decision network element, a service policy rule associated with the first data network connection based on information associated with the second forwarding plane network element;
  send the service policy rule to the second forwarding plane network element; and
  update a path of the first data network connection, wherein the updated path of the first data network connection maintains a connection through the first forwarding plane network element, and passes through the second forwarding plane network element; and
the second forwarding plane network element configured to:
  receive the service policy rule; and
  perform, according to the service policy rule, policy control on a packet transmitted on the updated path of the first data network connection.

17. The system according to claim 16, wherein the control plane network element is further configured to establish a session between the control plane network element and the policy decision network element, to obtain, from the policy decision network element by using the session, the service policy rule associated with the first data network connection.

18. The system according to claim 16, wherein for updating the path of the first data network connection, the control plane network element is further configured to:
  send a first packet forwarding policy to the first forwarding plane network element;
  send a second packet forwarding policy to the second forwarding plane network element; and
  send a third packet forwarding policy to a base station serving the user equipment,
    wherein the first packet forwarding policy, the second packet forwarding policy, and the third packet forwarding policy are for establishment of a tunnel between the second forwarding plane network element and the first forwarding plane network element and that is associated with the first data network connection, and for establishment of a path between the second forwarding plane network element and the base station serving the user equipment and that is associated with the first data network connection.

19. The system according to claim 18, further comprising the base station, serving the user equipment configured to: receive the third packet forwarding policy, and establish a path between the second forwarding plane network element and the base station serving the user equipment and that is associated with the first data network connection based on the third packet forwarding policy.

20. The system according to claim 16, further comprising the policy decision network element, to determine the service policy rule associated with the first data network connection based on the information associated with the second forwarding plane network element.

* * * * *

UNITED STATES PATENT AND TRADEMARK OFFICE
CERTIFICATE OF CORRECTION

PATENT NO. : 11,825,356 B2
APPLICATION NO. : 17/561509
DATED : November 21, 2023
INVENTOR(S) : Li et al.

It is certified that error appears in the above-identified patent and that said Letters Patent is hereby corrected as shown below:

In the Claims

Claim 19: Column 54, Line 21: "the base station, serving the user equipment configured to:" should read -- the base station, serving the user equipment, configured to: --.

Claim 20: Column 54, Line 28: "the policy decision network element, to determine the ser-" should read -- the policy decision network element, configured to determine the ser- --.

Signed and Sealed this
Twentieth Day of February, 2024

Katherine Kelly Vidal
Director of the United States Patent and Trademark Office